US011112969B2

(12) United States Patent
Klein et al.

(10) Patent No.: US 11,112,969 B2
(45) Date of Patent: *Sep. 7, 2021

(54) SYSTEM AND METHOD FOR MANAGING GUI OF VIRTUAL NVME ENTITIES IN NVME OVER FABRIC APPLIANCE

(71) Applicant: Toshiba Memory Corporation, Tokyo (JP)

(72) Inventors: Yaron Klein, Raanana (IL); Gil Buzaglo, Tel Aviv (IL)

(73) Assignee: Toshiba Memory Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,615

(22) Filed: Jun. 1, 2020

(65) Prior Publication Data

US 2020/0293194 A1 Sep. 17, 2020

Related U.S. Application Data

(63) Continuation of application No. 16/121,471, filed on Sep. 4, 2018, now Pat. No. 10,671,286.

(51) Int. Cl.
*G06F 3/048* (2013.01)
*G06F 3/06* (2006.01)
(Continued)

(52) U.S. Cl.
CPC .......... *G06F 3/0605* (2013.01); *G06F 3/0482* (2013.01); *G06F 3/04847* (2013.01);
(Continued)

(58) Field of Classification Search
None
See application file for complete search history.

(56) References Cited

U.S. PATENT DOCUMENTS 5,819,042 A * 10/1998 Hansen ............... H04L 41/0883
709/222
7,698,351 B1 * 4/2010 Hing .................... G06F 3/0482
707/827
(Continued)

FOREIGN PATENT DOCUMENTS

JP H07-044429 A 2/1995
JP 2010-146306 A 7/2010
(Continued)

OTHER PUBLICATIONS

International Search Report and Written Opinion for International Patent Application No. PCT/IB2019/057427, dated Dec. 3, 2019, 9 pages.

*Primary Examiner* — Hua Lu
(74) *Attorney, Agent, or Firm* — Foley & Lardner LLP

(57) ABSTRACT

A method includes enabling, by a processor, a user to create indication of configuration of a virtual subsystem. The processor enables the user to create, in the indication of configuration of the virtual subsystem, indication of a namespace associated with one of storage devices, indication of a controller, indication of a host, and indication of connectivity between a controller and a namespace or between a host and a namespace. The processor enables the user to select the indicated controller and the indicated namespace, select the indicated host and the indicated controller, and create, in the indication of configuration of virtual subsystem, indication of connectivity between the controller and the namespace and indication of connectivity between the host and the controller. The processor implements the configuration of the virtual subsystem in an appliance to cause the appliance to provide the host with storage access to the namespace via the controller.

20 Claims, 16 Drawing Sheets

(51) Int. Cl.
  *G06F 13/42*   (2006.01)
  *G06F 3/0482*  (2013.01)
  *G06F 3/0484*  (2013.01)
  *G06F 13/16*   (2006.01)

(52) U.S. Cl.
  CPC .......... *G06F 3/0629* (2013.01); *G06F 3/0664* (2013.01); *G06F 3/0673* (2013.01); *G06F 13/1668* (2013.01); *G06F 13/4282* (2013.01); *G06F 2213/0026* (2013.01)

(56) References Cited

U.S. PATENT DOCUMENTS

| | | | |
|---|---|---|---|
| 7,725,506 B1* | 5/2010 | Stringham | G06F 16/1724 707/822 |
| 10,089,134 B2* | 10/2018 | Geml | G06F 21/6209 |
| 2007/0214268 A1* | 9/2007 | Laurent | G06F 3/067 709/226 |
| 2008/0049641 A1* | 2/2008 | Edwards | H04L 43/0852 370/253 |
| 2009/0157956 A1* | 6/2009 | Kano | G06F 3/0647 711/112 |
| 2009/0276588 A1* | 11/2009 | Murase | G06F 3/0647 711/160 |
| 2010/0088328 A1* | 4/2010 | Joshi | G06F 9/45558 707/758 |
| 2010/0100611 A1* | 4/2010 | Hatasaki | G06F 13/10 709/221 |
| 2010/0153617 A1* | 6/2010 | Miroshnichenko | G06F 3/0635 711/6 |
| 2011/0106771 A1* | 5/2011 | McDonald | G06F 16/182 707/663 |
| 2011/0238715 A1* | 9/2011 | Quinn | G06F 16/196 707/822 |
| 2011/0271073 A1* | 11/2011 | Ikeda | G06F 11/1402 711/170 |
| 2012/0047340 A1* | 2/2012 | Inaba | G06F 11/2069 711/162 |
| 2012/0079424 A1* | 3/2012 | Rogers | G06F 16/176 715/810 |
| 2012/0150912 A1* | 6/2012 | Ripberger | G06F 16/24573 707/786 |
| 2013/0046906 A1* | 2/2013 | Ripberger | G06F 3/0631 710/12 |
| 2013/0212288 A1* | 8/2013 | Jakubowski | H04L 67/08 709/228 |
| 2013/0346532 A1* | 12/2013 | D'Amato | G06F 3/0617 709/213 |
| 2014/0007093 A1* | 1/2014 | Deshpande | G06F 9/45533 718/1 |
| 2015/0143134 A1* | 5/2015 | Hashimoto | G06F 21/6209 713/193 |
| 2015/0160878 A1* | 6/2015 | Chaurasia | G06F 3/0617 711/114 |
| 2015/0263899 A1* | 9/2015 | Tubaltsev | H04L 45/02 370/254 |
| 2015/0263946 A1* | 9/2015 | Tubaltsev | H04L 49/354 370/392 |
| 2017/0131853 A1* | 5/2017 | Keller | G06F 3/0482 |
| 2017/0131883 A1* | 5/2017 | Raveh | G06F 9/451 |
| 2017/0250865 A1* | 8/2017 | McCullough | H04L 67/26 |
| 2017/0344259 A1* | 11/2017 | Freyensee | G06F 3/061 |
| 2017/0359637 A1* | 12/2017 | Kuo | H04J 14/0267 |
| 2018/0063145 A1* | 3/2018 | Cayton | G06F 16/9535 |
| 2018/0074839 A1* | 3/2018 | Pachlore | G06F 9/445 |
| 2018/0260135 A1* | 9/2018 | Hayashida | G06F 13/1673 |
| 2019/0042144 A1* | 2/2019 | Peterson | G06F 3/067 |
| 2019/0146675 A1* | 5/2019 | Subramanian | G06F 3/06 711/170 |
| 2019/0227921 A1* | 7/2019 | Frolikov | G06F 12/1441 |
| 2020/0042236 A1* | 2/2020 | Subraya | G06F 3/061 |
| 2020/0059420 A1* | 2/2020 | Abraham | H04L 41/5054 |
| 2020/0403968 A1* | 12/2020 | Singh | H04L 41/0803 |

FOREIGN PATENT DOCUMENTS

| | | |
|---|---|---|
| JP | 2013-054402 A | 3/2013 |
| JP | 2014-146352 A | 8/2014 |

\* cited by examiner

SYSTEM AND METHOD FOR MANAGING GUI OF VIRTUAL NVME ENTITIES IN NVME OVER FABRIC APPLIANCE

CROSS-REFERENCE TO RELATED APPLICATIONS

The present application is a continuation of U.S. patent application Ser. No. 16/121,471 filed Sep. 4, 2018, now U.S. Pat. No. 10,671,286, the contents of which are incorporated herein by reference in their entirety.

TECHNICAL FIELD

The present disclosure generally relates to systems and methods for creating an abstracted or virtual subsystem over a pool of physical disks using a graphical user interface (GUI).

BACKGROUND

NVM Express (NVMe) is an interface that allows host software to communicate with a non-volatile memory subsystem, i.e., a NVMe subsystem. Unlike legacy singular Small Computer System Interface (SCSI) entities, NVMe subsystems may include multiple controllers, multiple namespaces and their connectivity. NVMe over Fabric (NVMeoF) is a transport mechanism to expose a remote device over a network fabric to a local host, scaling out to large numbers of NVMe devices and extending the distance within a datacenter over which NVMe devices and NVMe subsystems can be accessed. There is a need to create an abstracted or virtual NVMe subsystem, carved out from a pool of physical devices which are exposed via NVMeoF connectivity.

BRIEF DESCRIPTION

According to certain aspects, one or more embodiments described herein are directed to systems and methods for enabling a user to create an abstracted or virtual subsystem over a pool of physical disks using a graphical user interface (GUI). The virtual subsystem configuration GUI or a computing system executing the GUI ("virtual subsystem configuration system") can provide methods of creating such subsystems with easy and intuitive GUI APIs. These methods utilize common GUI practices, such as copy, move, connect, right click, drag and drop, and more. Using the virtual subsystem configuration GUI, the user can easily and intuitively create NVMe entities (e.g., controllers, namespaces, ports, or hosts) or define connectivity therebetween to provide configuration of a virtual subsystem. In addition, the virtual subsystem configuration system can provide hints and assistance for automating the selection of parameters of each entity and connectivity.

In one or more embodiments according to a first aspect, a system for providing configuration of virtual subsystems that can provide connectivity between a plurality of hosts and a plurality of storage devices, includes a processor and memory. The processor is configured to generate a virtual subsystem graphical user interface (GUI) rendering indication of configuration of a first virtual subsystem configuring connectivity between one or more the plurality of hosts and one or more of the plurality of storage devices. The processor is further configured to generate a namespace creation GUI rendering in the virtual subsystem GUI, in response to user selection of the namespace creation GUI, indication of a first namespace that is associated with one of the plurality of storage devices. The processor is further configured to generate a controller creation GUI rendering in the virtual subsystem GUI, in response to user selection of the controller creation GUI, indication of a first controller, and generate a host creation GUI rendering, in response to user selection of the host creation GUI, indication of a first host. The processor is further configured to generate a connectivity GUI rendering in the virtual subsystem GUI, indication of connectivity between a controller and a namespace or between a host and a namespace. The processor is further configured to, in response to user selection of the indicated first controller and the indicated first namespace, render, by the connectivity GUI in the virtual subsystem GUI, indication of connectivity between the first controller and the first namespace. The processor is further configured to, in response to user selection of the indicated first host and the indicated first controller, render, by the connectivity GUI in the virtual subsystem GUI, indication of connectivity between the first host and the first controller. The processor is further configured to create an appliance configuration by compiling the indication of the configuration of the first virtual subsystem as rendered in the virtual subsystem GUI so that when the appliance configuration is implemented in the appliance, the appliance can provide the first host with storage access to the first namespace via the first controller.

In one or more embodiments according to another aspect, a method for providing configuration of virtual subsystems that can provide connectivity between a plurality of hosts and a plurality of storage devices, includes enabling, by a processor of a computer system, a user of the computer system to create indication of configuration of a first virtual subsystem configuring connectivity between one or more the plurality of hosts and one or more of the plurality of storage devices. The method further includes enabling, by the processor, the user to create in the indication of configuration of the first virtual subsystem, indication of a first namespace that is associated with one of the plurality of storage devices. The method further includes enabling, by the processor, the user to create indication of a first controller in the indication of configuration of the first virtual subsystem. The method further includes enabling, by the processor, the user to create indication of a first host in the indication of configuration of the first virtual subsystem. The method further includes enabling, by the processor, the user to create in the indication of configuration of the first virtual subsystem, indication of connectivity between a controller and a namespace or between a host and a namespace. The method further includes enabling, by the processor, the user to select the indicated first controller and the indicated first namespace, and create indication of connectivity between the first controller and the first namespace in the indication of configuration of the first virtual subsystem, and enabling, by the processor, the user to select the indicated first host and the indicated first controller, and create indication of connectivity between the first host and the first controller in the indication of configuration of the first virtual subsystem. The method further includes implementing, by the processor, the configuration of the first virtual subsystem in an appliance to cause the appliance to provide the first host with storage access to the first namespace via the first controller.

In one or more embodiments according to another aspect, a computer program product for providing configuration of virtual subsystems that can provide connectivity between a plurality of hosts and a plurality of storage devices, includes a non-transitory computer readable storage medium having computer readable program code embodied therein that executes to perform operations. The operations include generating a virtual subsystem graphical user interface (GUI) rendering indication of configuration of a first virtual subsystem configuring connectivity between one or more the plurality of hosts and one or more of the plurality of storage devices. The operations further include generating a namespace creation GUI rendering in the virtual subsystem GUI, in response to user selection of the namespace creation GUI, indication of a first namespace that is associated with one of the plurality of storage devices. The operations further include generating a controller creation GUI rendering in the virtual subsystem GUI, in response to user selection of the controller creation GUI, indication of a first controller. The operations include generating a host creation GUI rendering, in response to user selection of the host creation GUI, indication of a first host. The operations further include generating a connectivity GUI rendering in the virtual subsystem GUI, indication of connectivity between a controller and a namespace or between a host and a namespace. The operations further include in response to user selection of the indicated first controller and the indicated first namespace, rendering, by the connectivity GUI in the virtual subsystem GUI, indication of connectivity between the first controller and the first namespace. The operations further include in response to user selection of the indicated first host and the indicated first controller, rendering, by the connectivity GUI in the virtual subsystem GUI, indication of connectivity between the first host and the first controller. The operations further include implementing the configuration of the first virtual subsystem as rendered in the virtual subsystem GUI, in an appliance to cause the appliance to provide the first host with storage access to the first namespace via the first controller.

DETAILED DESCRIPTION

The embodiments described herein provide for certain improvements, including easy and intuitive graphical user interface (GUI) APIs and methods of providing hints and assistance for automating the selection of parameters of NVMe entities and connectivity therebetween. One or more of the embodiments described herein provide a virtual subsystem configuration GUI that designs such NVMe entities (e.g., controllers, namespaces, ports, or hosts) and connectivity therebetween (e.g., a connection between a controller and a namespace) to define an abstracted or virtual subsystem. One or more of the embodiments described herein provide an intuitive method for the user to carve out an abstracted or virtual subsystem over a pool of physical storage devices using the virtual subsystem configuration GUI.

Figure 1A:
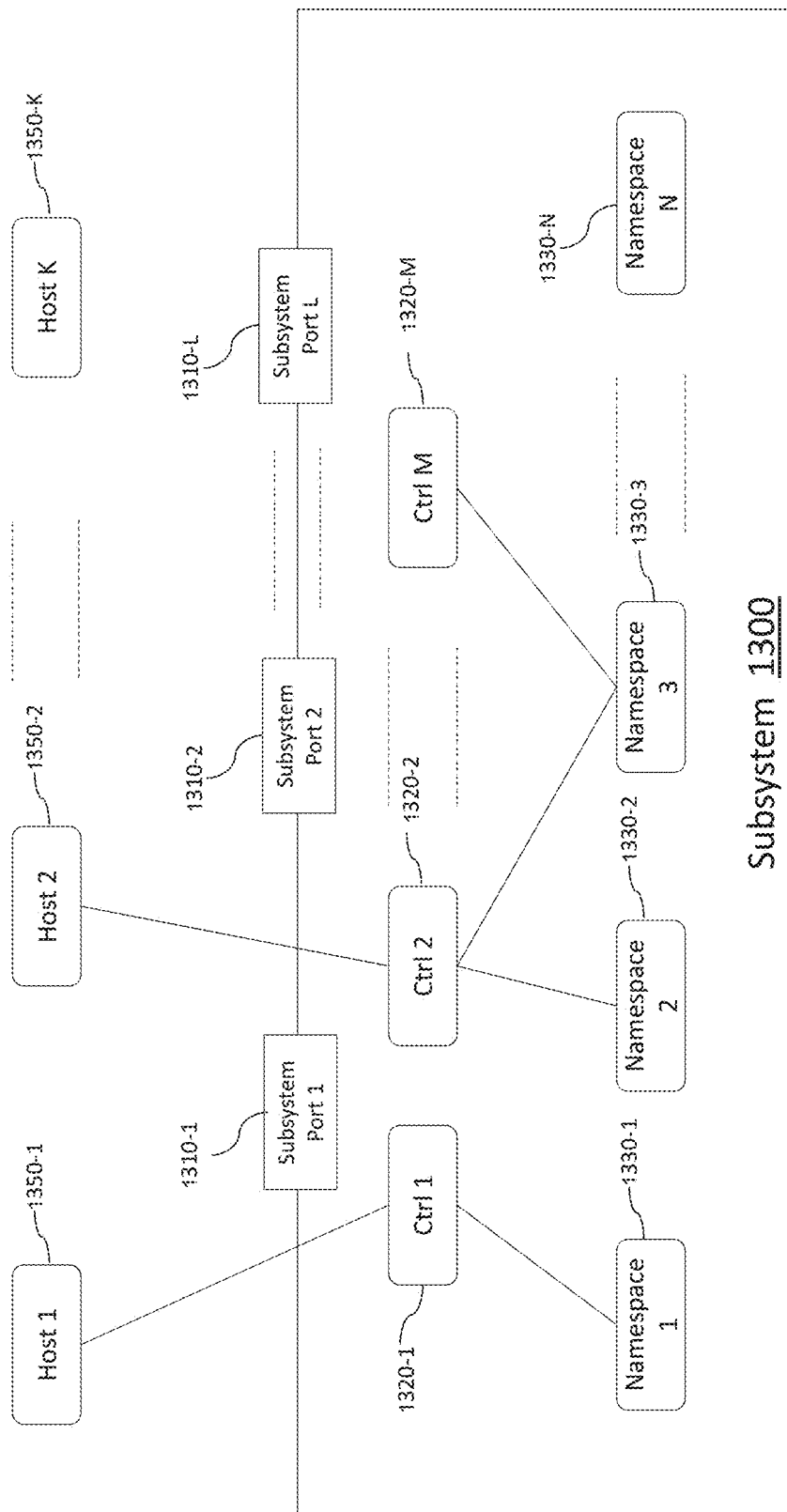
FIG. 1A shows a block diagram of an NVMe subsystem according to one or more embodiments of the present disclosure.

FIG. 1A shows a block diagram of an NVMe subsystem according to one or more embodiments of the present disclosure. Referring to FIG. 1A, an NVMe subsystem 1300 may include one or more namespaces 1 (1330-1) to N (1330-N), one or more controllers 1 (1320-1) to M (1320-M), and one or more subsystem ports 1 (1310-1) to L (1310-L). One or more hosts 1 (1350-1) to K (1350-K) can communicate with the subsystem 1300.

Figure 3:
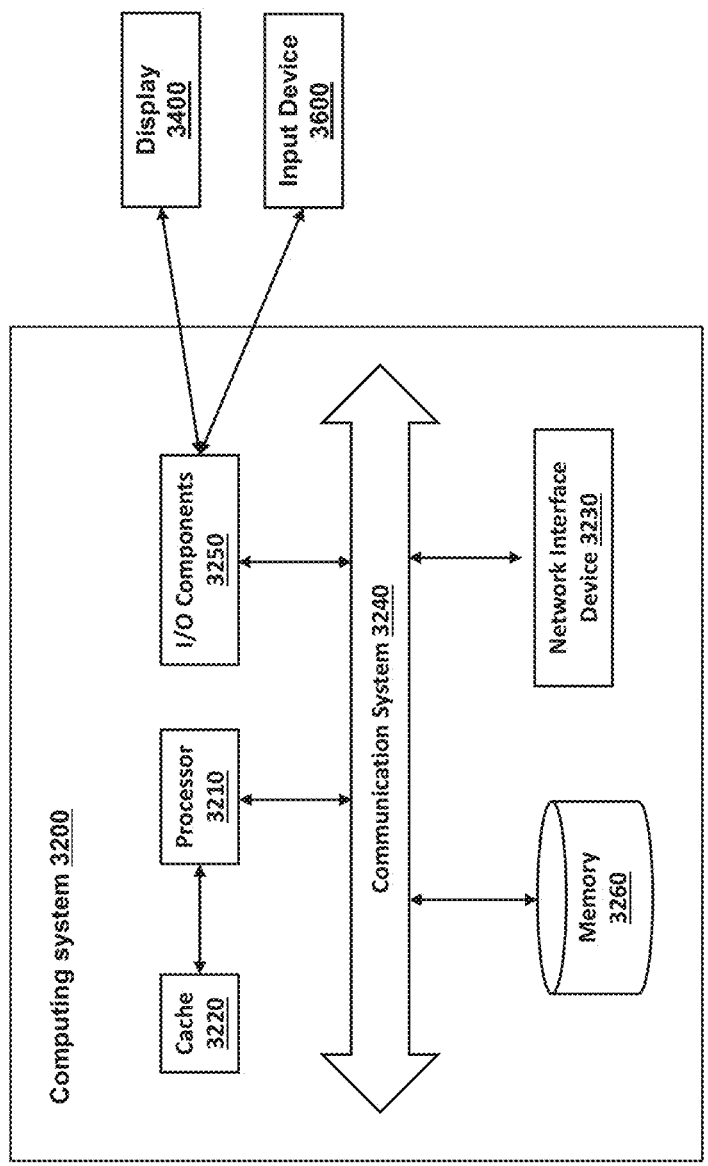
FIG. 3 shows a block diagram of a computing system according to one or more embodiments of the present disclosure.

Each of the hosts may have a configuration similar to a computing system as shown in FIG. 3. In some implementations, the hosts support NVMe so that software in the hosts can communicate with a non-volatile memory subsystem over PCI Express. In some implementations, the hosts support NVMe over Fabrics (NVMeoF) so that software in the hosts can communicate with a non-volatile memory subsystem over interconnects other than PCI Express. NVMeoF is a transport protocol that enables remote access of a host to a NVMe device over network fabrics or interconnects other than PCI Express. Each of the controllers may have a configuration similar to a computing system as shown in FIG. 3.

A namespace is a quantity of non-volatile memory that may be formatted into logical blocks. An NVMe controller may support multiple namespaces that are referenced using a namespace ID so that a controller can be associated with one or more namespaces. For example, referring to FIG. 1A, the controller 2 (1320-2) is associated with both the namespace 2 (1330-2) and the namespace 3 (1330-3). A namespace can be associated with one or more controllers. For example, referring to FIG. 1A, the namespace 3 (1330-3) is associated with both the controller 2 (1320-2) and the controller M (1320-M). In other words, a relationship between controllers and namespaces may be one-to-one or one-to-many or many-to-many.

Each of the subsystem ports 1310-1 to 1310-L may be a Peripheral Component Interconnect (PCI) Express port or non-PCI Express port (a fabric port other than PCI Express port—e.g., remote direct memory access (RDMA), Fibre Channel (FC), InfiniBand (IB)). A subsystem port can be associated with a respective controller. For example, a controller can map to PCI Function 0 of the corresponding subsystem port. A subsystem port can be associated with multiple controllers. For example, a controller can map to PCI Function 0 of the corresponding subsystem port and three other controllers can map to three Virtual Functions of the same subsystem port, respectively.

FIG. 1A also shows routing topology from a namespace to a host. For example, the namespace 1 (1330-1) is exposed to the host 1 (1350-1) via the controller 1 (1320-1). In one or more embodiments described herein, a host can be connected to an NVMe device via NVMe over Fabric (NVMeoF). For example, NVMeoF enables connectivity between host and a remote disk, which is a physical NVMe disk supporting NVMeoF. In other words, the physical disk is exposed "as is" as a subsystem with its topology to the host.

Figure 1B:
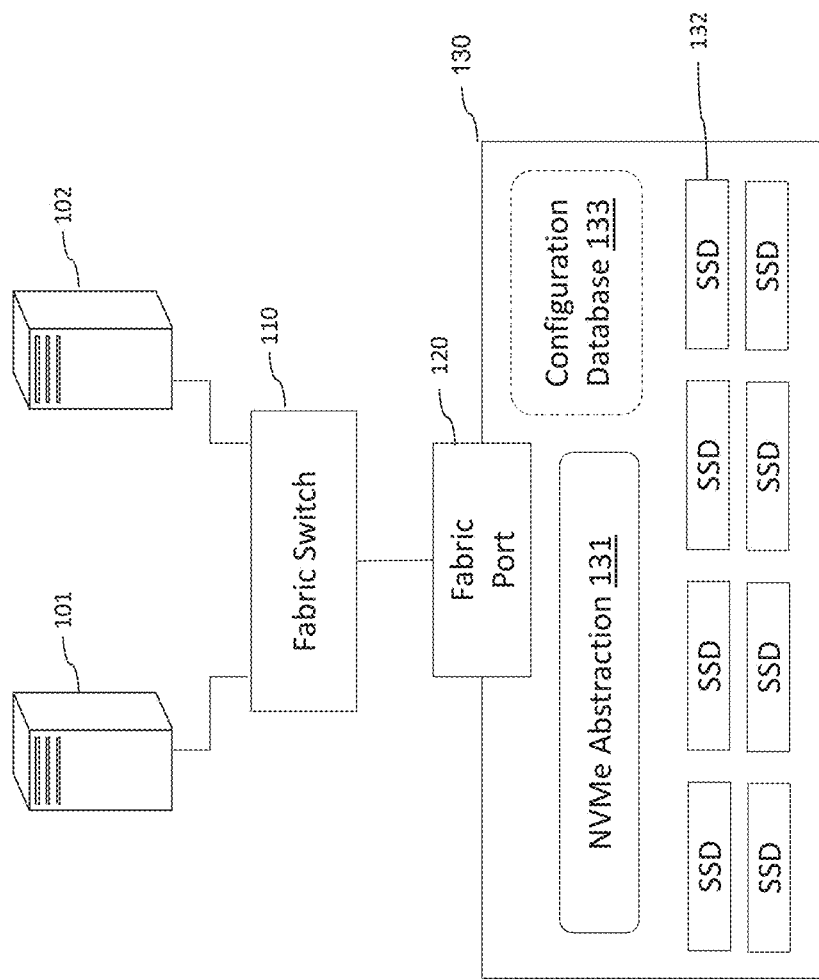
FIG. 1B shows a block diagram of a virtual NVMe subsystem according to one or more embodiments of the present disclosure.

FIG. 1B shows a block diagram of a virtual NVMe subsystem according to one or more embodiments of the present disclosure. Referring to FIG. 1B, a virtual subsystem can be created or configured in a storage appliance 130 populated with a pool of solid state drives (SSDs) 132 and having a fabric port 120. In one or more embodiments described herein, the storage appliance 130 can expose a virtual subsystem, carved out from the storage pool 132 using an NVMe abstraction layer (or virtualization layer) 131. In one or more embodiments described herein, the abstraction layer 131 supports NVMe protocol translation. The storage pool may be NVMe devices or even non-NVMe device, e.g., serial attached SCSI (SAS) and serial advanced technology attachment (SATA). For example, the abstraction layer 131 may expose a non-NVMe device (e.g., SAS) as a virtual subsystem to a host (101 or 102) by mapping SCSI commands to NVMe commands using the protocol translation of the abstraction layer 131 so that the host can be connected to the non-NVMe device over NVMeoF transport via a fabric switch 110 and a fabric port 120 of the storage appliance 130. In one or more embodiments described herein, the host 101 or 102 may have a configuration similar to a computing system as shown in FIG. 3. In one or more embodiments described herein, the storage appliance 130 may have a configuration similar to a computing system as shown in FIG. 3. In one or more embodiments described herein, the storage appliance 130 may include a configuration database 133 storing configuration of virtual subsystems so that the configuration, if executed by the storage appliance 130, exposes the storage appliance 130 as a virtual subsystem specified by the configuration.

Figure 2:
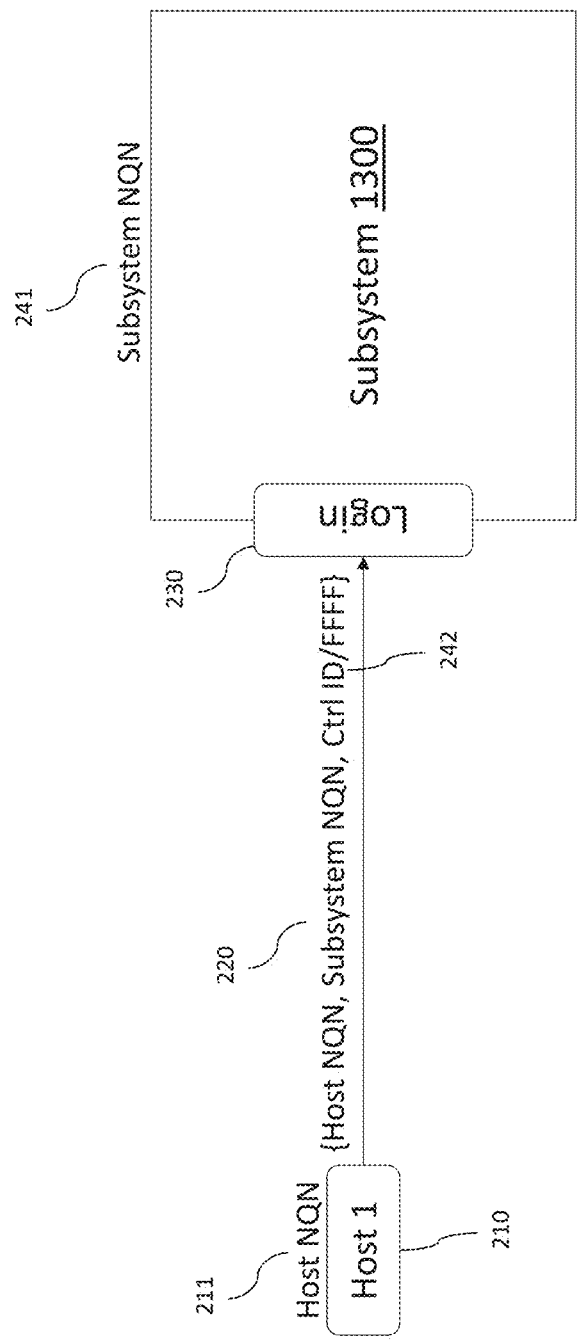
FIG. 2 shows a block diagram of an access control to an NVMe subsystem according to one or more embodiments of the present disclosure.

FIG. 2 shows a block diagram of an access control to an NVMe subsystem according to one or more embodiments of the present disclosure. In one or more embodiments described herein, an access control to an NVMe subsystem can be implemented using unique worldwide identifiers for host and subsystems, e.g., NVMe qualified name (NQN). For example, referring to FIG. 2, when a host 210 (or a user of the host) is logged in a subsystem 1300 (see FIG. 1A), the host 210 may send an NVMeoF connect command 220 to gain access to the subsystem 1300. The host 210 may be any one of the host 1301-1 to the host 1350-K as shown in FIG. 1A. In one or more embodiments described herein, the connect command 220 may include a host NQN 211 identifying the host 210, a subsystem NQN 241 identifying the subsystem 1300, and a specific controller ID 242 (denoted as Static Controller mode in NVMeoF standard) or "FFFF" indicating that the host may accept a connection to the specific controller or any available controller (denoted as Dynamic Controller mode in NVMeoF standard). In one or more embodiments described herein, the subsystem 1300 includes a login module that upon receiving the connect command 220, performs authentication and grants access of the host 210 to the specific controller or returns any available controller ID to the host (if the controller ID 242 was set to "FFFF").

FIG. 3 shows a block diagram of a computing system according to one or more embodiments of the present disclosure. Referring to FIG. 3, the illustrated example computing system 3200 includes one or more processors 3210 in communication, via a communication system 3240 (e.g., bus), with memory 3260, at least one network interface controller 3230 with network interface port for connection to a network (not shown), and other components, e.g., an input/output ("I/O") components interface 3250 connecting to a display 3400 and an input device 3600. Generally, the processor(s) 3210 will execute instructions (or computer programs) received from memory. The processor(s) 3210 illustrated incorporate, or are directly connected to, cache memory 3220. In some instances, instructions are read from memory 3260 into cache memory 3220 and executed by the processor(s) 3210 from cache memory 3220.

In more detail, the processor(s) 3210 may be any logic circuitry that processes instructions, e.g., instructions fetched from the memory 3260 or cache 3220. In many implementations, the processor(s) 3210 are microprocessor units or special purpose processors. The computing device 3200 may be based on any processor, or set of processors, capable of operating as described herein. The processor(s) 3210 may be single core or multi-core processor(s). The processor(s) 3210 may be multiple distinct processors.

The memory 3260 may be any device suitable for storing computer readable data. The memory 3260 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 3200 may have any number of memory devices as the memory 3260.

The cache memory 3220 is generally a form of computer memory placed in close proximity to the processor(s) 3210 for fast read times. In some implementations, the cache memory 3220 is part of, or on the same chip as, the processor(s) 3210. In some implementations, there are multiple levels of cache 3220, e.g., L2 and L3 cache layers.

The network interface controller 3230 manages data exchanges via the network interface (sometimes referred to as network interface ports). The network interface controller 3230 handles the physical and data link layers of the OSI model for network communication. In some implementations, some of the network interface controller's tasks are handled by one or more of the processor(s) 3210. In some implementations, the network interface controller 3230 is part of a processor 3210. In some implementations, a computing system 3200 has multiple network interfaces controlled by a single controller 3230. In some implementations, a computing system 3200 has multiple network interface controllers 3230. In some implementations, each network interface is a connection point for a physical network link (e.g., a cat-5 Ethernet link). In some implementations, the network interface controller 3230 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 3230 implements one or more network protocols such as Ethernet. Generally, a computing device 3200 exchanges data with other computing devices via physical or wireless links through a network interface. The network interface may link directly to another device or to another device via an intermediary device, e.g., a network device such as a hub, a bridge, a switch, or a router, connecting the computing device 3200 to a data network such as the Internet.

The computing system 3200 may include, or provide interfaces for, one or more input or output ("I/O") devices.

Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 3200 may include an interface (e.g., a universal serial bus (USB) interface) for connecting input devices, output devices, or additional memory devices (e.g., portable flash drive or external media drive). In some implementations, a computing device 3200 includes an additional device such as a co-processor, e.g., a math co-processor can assist the processor 3210 with high precision or complex calculations.

In one or more embodiments described herein, in order to create or define a virtual subsystem over a storage pool, a user may specify or provide at least one of (1) the number of namespaces, (2) capacity of the namespaces, (3) number of controllers, (4) connectivity between controllers and namespaces, (5) access control between hosts and a subsystem, (6) failure domain of a namespace (e.g., how many disks a namespace spans), (7) failure domain of a subsystem (e.g., how many disks a namespace spans), (8) quality of service (QoS) and service level agreement (SLA) of namespaces, or (9) QoS and SLA of subsystems. Systems and methods for creating a virtual subsystem over a storage pool according to according to one or more embodiments of the present disclosure will be described below in more detail with reference to FIGS. 4A-6.

FIGS. 4A-4F show example operations of GUIs for creating virtual NVMe entities according to one or more embodiments of the present disclosure. In one or more embodiments described herein, a virtual subsystem configuration system can create or define configuration of virtual subsystems that can provide connectivity between a plurality of hosts (e.g., the hosts 1-N in FIG. 1A) and a plurality of storage devices (e.g., the pool of SSDs 132 in FIG. 1B). In one or more embodiments described herein, the virtual subsystem configuration system may be a computing system 3200 as shown in FIG. 3. In one or more embodiments described herein, the virtual subsystem configuration system may be an NVMe host 101 or 102 as shown in FIG. 1B. In one or more embodiments described herein, a computer program product can create or define configuration of virtual subsystems that can provide connectivity between a plurality of hosts and a plurality of storage devices. For example, the computer program product may include GUI APIs that can create or define configuration of virtual subsystems that can provide connectivity between a plurality of hosts and a plurality of storage devices. In some implementations, the computer program product may include a non-transitory computer readable storage medium having computer readable program code embodied therein that executes to perform operations to create or define configuration of virtual subsystems.

Figure 4A:
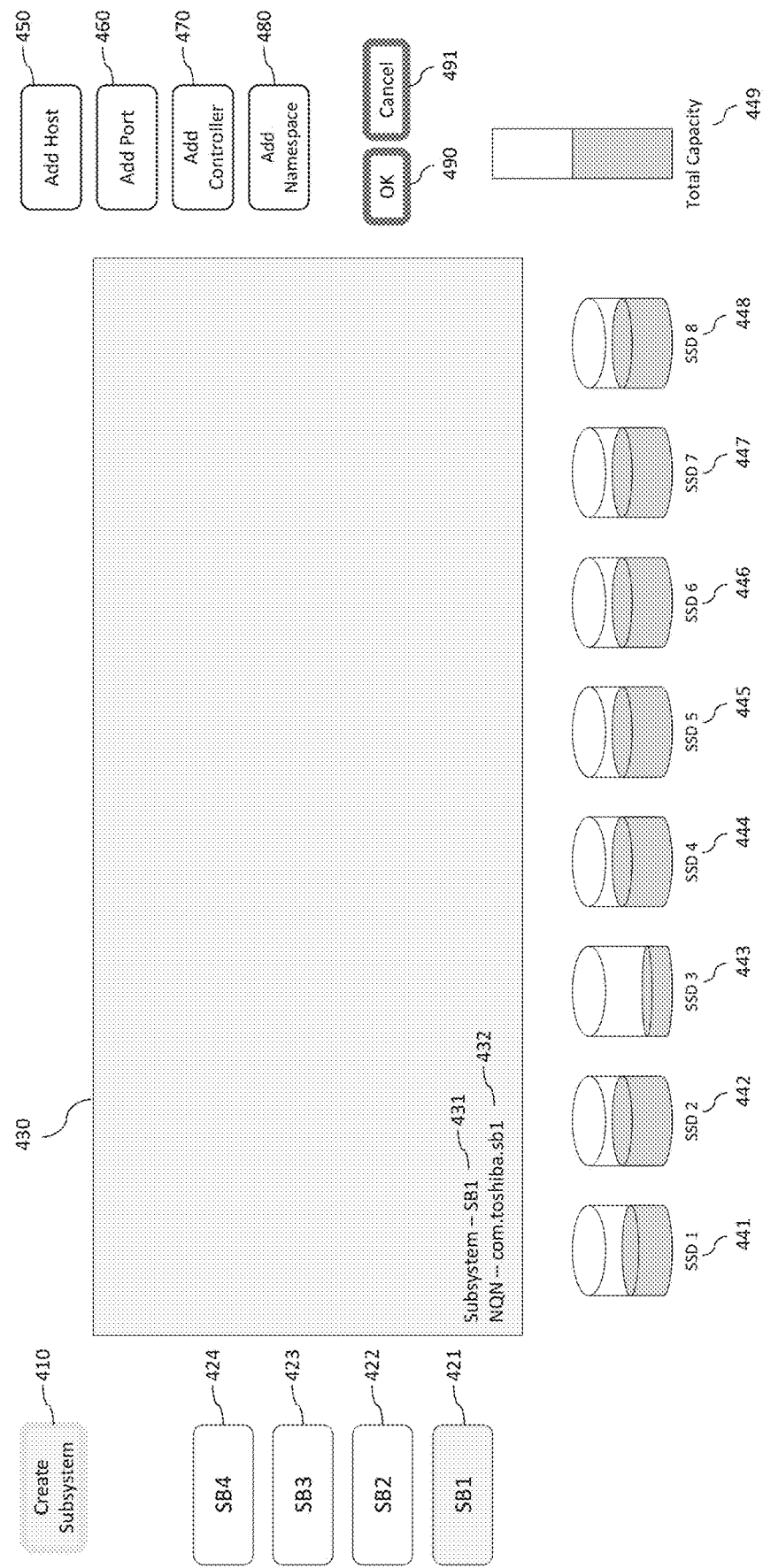
FIGS. 4A-4F show example operations of GUIs for creating virtual NVMe entities according to one or more embodiments of the present disclosure.

Referring to FIG. 4A, the virtual subsystem configuration system generates (or creates or defines) a virtual subsystem graphical user interface (GUI) 430. In one or more embodiments described herein, the virtual subsystem configuration system (e.g., the computing system 3200 in FIG. 3) may display in a display (e.g., the display 3400 in FIG. 3) "create subsystem" button 410 and a storage device GUI 441-449. In one or more embodiments described herein, the storage device GUI includes indication of a plurality of storage devices (e.g., SSDs 1 (441) to 8 (448)), and indication of a total capacity of the plurality of devices (e.g., indication of total capacity 449).

Referring to FIG. 4A, if a user clicks the "create subsystem" button 410, the system may create a new virtual subsystem (e.g., a virtual subsystem named "SB1", "SB2", "SB3", or "SB4") and display the corresponding (virtual) subsystem button (e.g., one of "SB1" button 421, "SB2" button 422, "SB3" button 423, "SB4" button 424) and the corresponding virtual subsystem GUI 430. In one or more embodiments described herein, if the user clicks one of subsystem buttons, then the system may display or generate the corresponding virtual subsystem GUI 430, and a plurality of entity creation GUIs including a host creation GUI (e.g., "add host" button 450), a port creation GUI (e.g., "add port" button 460), a controller creation GUI (e.g., "add controller" button 470), and a namespace creation GUI (e.g., "add namespace" button 480). The system also may display an "OK" button 490 and a "Cancel" button 491. For example, as shown in FIG. 4A, if the user clicks the subsystem button 421 ("SB1"), the system display the virtual subsystem GUI 430 corresponding to the virtual subsystem "SB1", the plurality of add buttons 450-480, the OK button 490, and the cancel button 491. In one or more embodiments described herein, the system may display a text 431 and a text 432 respectively indicating the name and NQN of the virtual subsystem currently being displayed.

In one or more embodiments described herein, referring to FIG. 4A, the virtual subsystem configuration system may display a storage device GUI 441-449 that can render indication of total usable storage space of the plurality of storage devices. In one or more embodiments described herein, the storage device GUI includes indication of a plurality of storage devices (e.g., SSDs 1 (441) to 8 (448)), and indication of a total capacity of the plurality of devices (e.g., indication of total capacity 449). The indication of the plurality of storage devices 441-448 may include graphical indication of each SSD (e.g., as a cylinder) with graphical indication of its current storage usage (e.g., as shaded volume of the cylinder) and current usable storage space (as empty volume of the cylinder). For example, as shown in FIG. 4A, the current storage usage of the storage device 443 is indicated smaller than the current storage usage of the storage device 444. In one or more embodiments described herein, the indication of the total capacity of the plurality of devices is a bar 449 showing the total allocation (e.g., the total area of the bar 449) and free space available (e.g., the unshaded area of the bar 449). In one or more embodiments described herein, the system may be an NVMe host (e.g., 101 or 102 in FIG. 1B) and obtain the current disk usage of each storage device using protocol mapping by the NVMe abstraction layer 131 (see FIG. 1B). For example, the system may issue to SCSI SSDs (e.g., SSDs 132 in FIG. 1B) an NVMe command mapped to "read capacity" command in the SCSI protocol and obtain the current disk usage of each storage device by translating the result returned from SCSI storage devices to an NVMe format. The system may obtain the total capacity of the plurality of devices in a similar manner.

In one or more embodiments described herein, if the user double clicks one of the existing subsystem buttons 421-424, the system shows an edit GUI (not shown) which includes input interfaces for entering the name and NQN of the selected virtual subsystem so that the user can edit the name and NQN of the selected virtual subsystem.

Figure 4B:
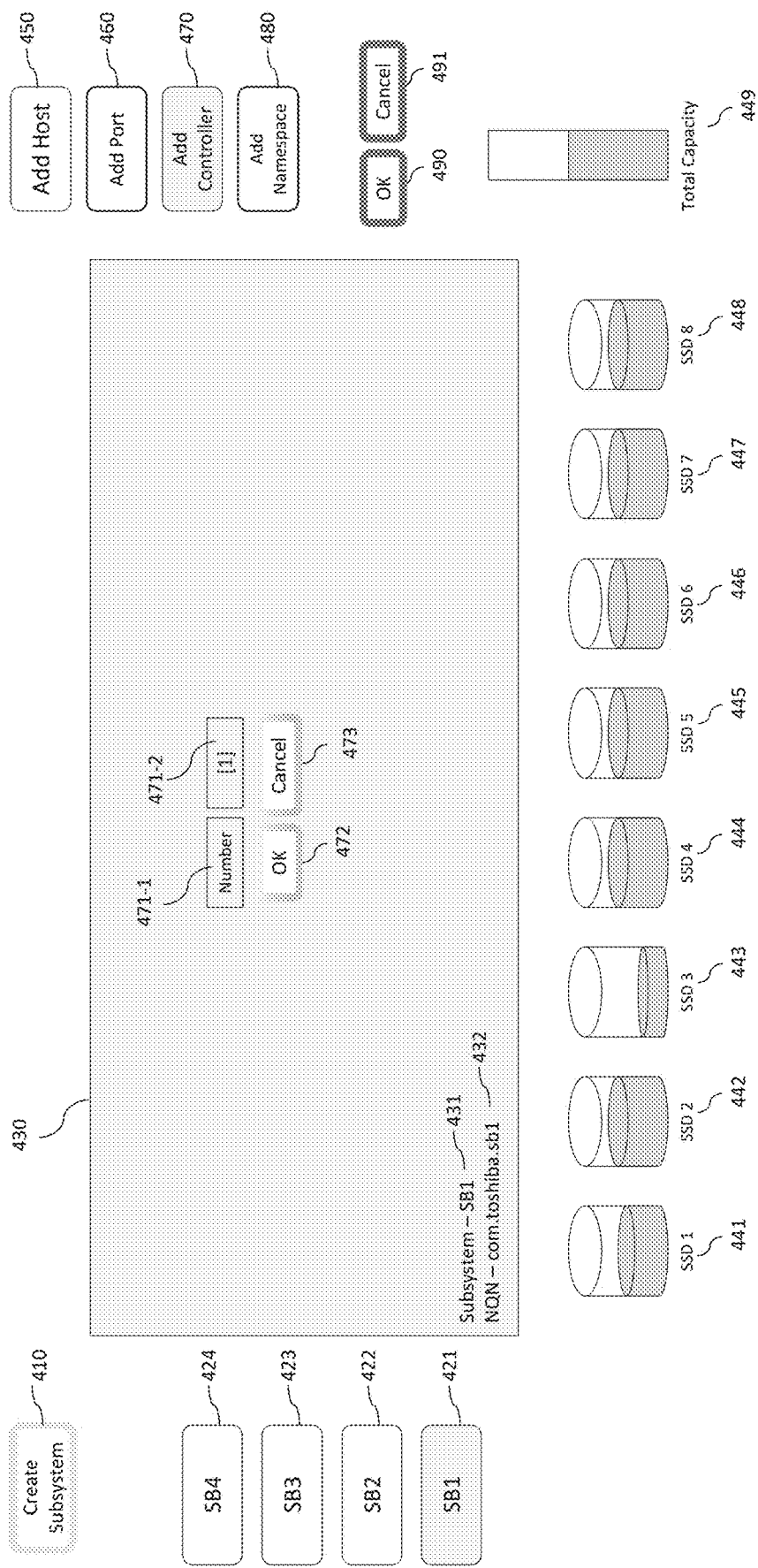

Referring to FIG. 4B, in response to user selection of the controller creation GUI (e.g., the "add controller" button 470), the controller creation GUI may render indication of a first controller in the virtual subsystem GUI 430. For example, if the user clicks the "add controller" button 470, the system may render, in the virtual subsystem GUI 430, an input menu related to the parameters of the first controller, including a text label 471-1 indicating "Number", an input interface 471-2, an "OK" button 472, and a "cancel" button 473. The input interface may be a text field, or other input interfaces such as drop-down list, checkbox, radio button, etc. For example, as shown in FIG. 4B, the user can specify the number of controllers in the input interface 471-2 to add them to the configuration of the virtual subsystem "SB1" (default value is 1). When the "OK" button 472 is pressed, the selected number of controllers are added to the configuration of the virtual subsystem "SB1" and graphical indication of the added controllers (e.g., a button 433 indicating "controller 1" in FIG. 4C) is rendered in the virtual subsystem GUI 430. When the "cancel" button 473 is pressed, the addition of the selected number of controllers is canceled. In one or more embodiments described herein, more advance parameters such as bandwidth or input/output per second (IOPS) of the first controller can be specified so that the user can specify potential or maximal performance of the controller to be added. In one or more embodiments described herein, the system may provide hints and assistance for automating the selection of parameters of the first controller (e.g., the number or bandwidth or IOPS of available controllers). For example, the system can issue NVMe identify commands to obtain the number or bandwidth or IOPS of available controllers in a storage appliance (e.g., the storage appliance 130 in FIG. 1B) and use the information to provide hints and assistance (e.g., display hint or set default based on entity information obtained from a target storage appliance) for automatically selecting valid parameters of the first controller.

In one or more embodiments described herein, in response to user selection of the controller creation GUI, the controller creation GUI may render in the virtual subsystem GUI, indication of another controller in addition to the first controller. For example, referring to FIG. 4B, after pressing the "OK" button 472 and (as a result) adding the first controller, the user may click the "add controller" button 470 again to add a second controller to the configuration of the virtual subsystem "SB1". Subsequently, the system may display the same input menu related to the parameters of a second controller, including a text label 471-1 indicating "Number", an input interface 471-2, an "OK" button 472, and a "cancel" button 473.

In one or more embodiments described herein, referring to FIG. 4B, the system may generate or display a port creation GUI (e.g., the "add port" button 460). In response to user selection of the port creation GUI, the port creation GUI may render in the virtual subsystem GUI 430, indication of a first port of the first virtual subsystem (not shown). For example, if the user clicks the "add port" button 460, the system may render, in the virtual subsystem GUI 430, an input menu related to the parameters of the first port, including a text label similar to the text label 471-1, an input interface similar to the input interface 471-2, an "OK" button similar to the "OK" button 472, and a "cancel" button similar to the "cancel" button 473. In one or more embodiments described herein, pressing the "add port" button 450 may allow the user to set multiple physical ports if available. For example, the system may set the default port to Ethernet port. In response to user selection of the port creation GUI, the port creation GUI may render in the virtual subsystem GUI, indication of another port in addition to the first port.

Figure 4C:
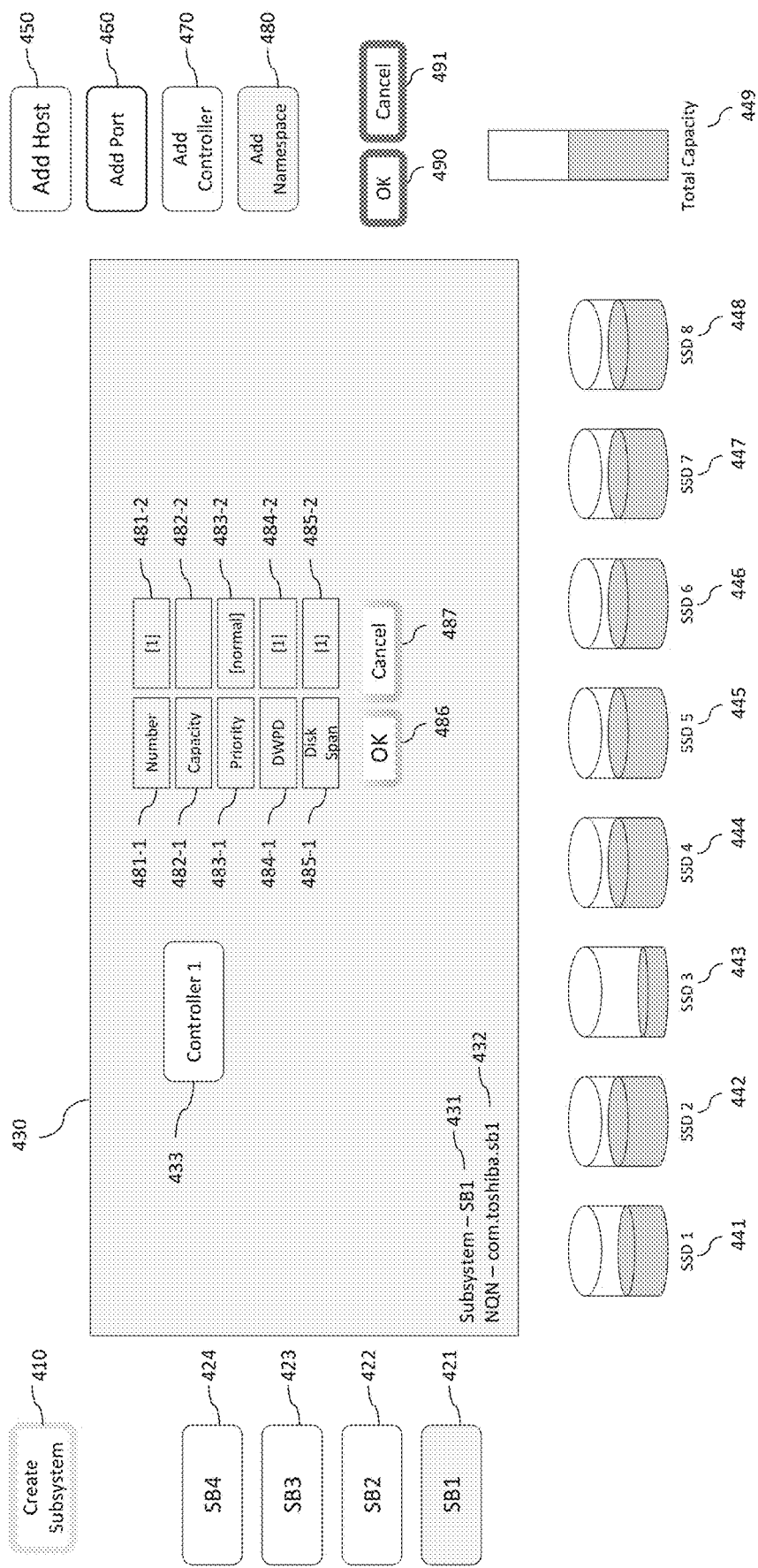

Referring to FIG. 4C, the system generates or displays a namespace creation GUI (e.g., the "add namespace" button 480). In response to user selection of the namespace creation GUI, the namespace creation GUI may render in the virtual subsystem GUI 430, indication of a first namespace that is associated with one of the plurality of storage devices. For example, if the user clicks the "add namespace" button 480, the system may render, in the virtual subsystem GUI 430, an input menu related to the parameters of the first namespace, including (1) a text label 481-1 indicating "Number" and the corresponding input interface 481-2, (2) a text label 482-1 indicating "Capacity" and the corresponding input interface 482-2, (3) a text label 483-1 indicating "Priority" and the corresponding input interface 483-2, (4) a text label 484-1 indicating "DWPD" and the corresponding input interface 484-2, (5) a text label 485-1 indicating "Disk Span" and the corresponding input interface 485-2, an "OK" button 486, and a "cancel" button 487. As shown in FIG. 4C, to add the first namespace(s) to the configuration of the virtual subsystem "SB1", the user can specify (1) the number of namespaces to be added in the input interface 481-2 (default value is 1), (2) the capacity (e.g., in bytes) of the namespace(s) in the input interface 482-2, (3) the priority (default is "normal") of the namespace(s) in the input interface 483-2, (4) the workload (e.g., in DWPD (drive writes per day), default is 1 DWPD) of the namespace(s) in the input interface 484-2, and the disk span as a failure domain (default is 1 disk) of the namespace(s) in the input interface 485-2. When the "OK" button 486 is pressed, the selected number of namespace(s) with the specified parameters are added to the configuration of the virtual subsystem "SB1" and graphical indication of the added namespace(s) (e.g., a button 434 indicating "Namespace 1" in FIG. 4D) is rendered in the virtual subsystem GUI 430. When the "cancel" button 487 is pressed, the addition of the selected number of namespace(s) is canceled.

In one or more embodiments described herein, additional parameters such as quality of service (QoS), service level agreement (SLA), bandwidth or input/output per second (IOPS) of the first namespace(s) can be specified so that the user can specify potential or maximal performance of the namespace(s) to be added. In one or more embodiments described herein, the system may provide hints and assistance for automating the selection of parameters of the first namespace(s) (e.g., the number, capacity, priority, workload, disk span, QoS, SLA, bandwidth or IOPS of available namespaces). For example, the system can issue NVMe identify commands to obtain the number, capacity, priority, workload, disk span, QoS, SLA, bandwidth or IOPSs of available namespaces in a storage appliance (e.g., the storage appliance 130 in FIG. 1B) and use the information to provide hints and assistance (e.g., display hint or set default based on entity information obtained from a target storage appliance) for automatically selecting valid parameters of the first namespace(s).

In response to user selection of the namespace creation GUI, the namespace creation GUI may render in the virtual subsystem GUI, indication of a second namespace that is associated with one of the plurality of storage devices. For example, referring to FIG. 4C, after pressing the "OK" button 486 and (as a result) adding the first namespace(s), the user may click the "add namespace" button 480 again to add a second namespace to the configuration of the virtual subsystem "SB1". Subsequently, the system may display the same input menu related to the parameters of the second namespace, including the text labels 481-1 to 485-1, the input interfaces 481-2 to 485-2, the "OK" button 486, and the "cancel" button 487.

Figure 4D:
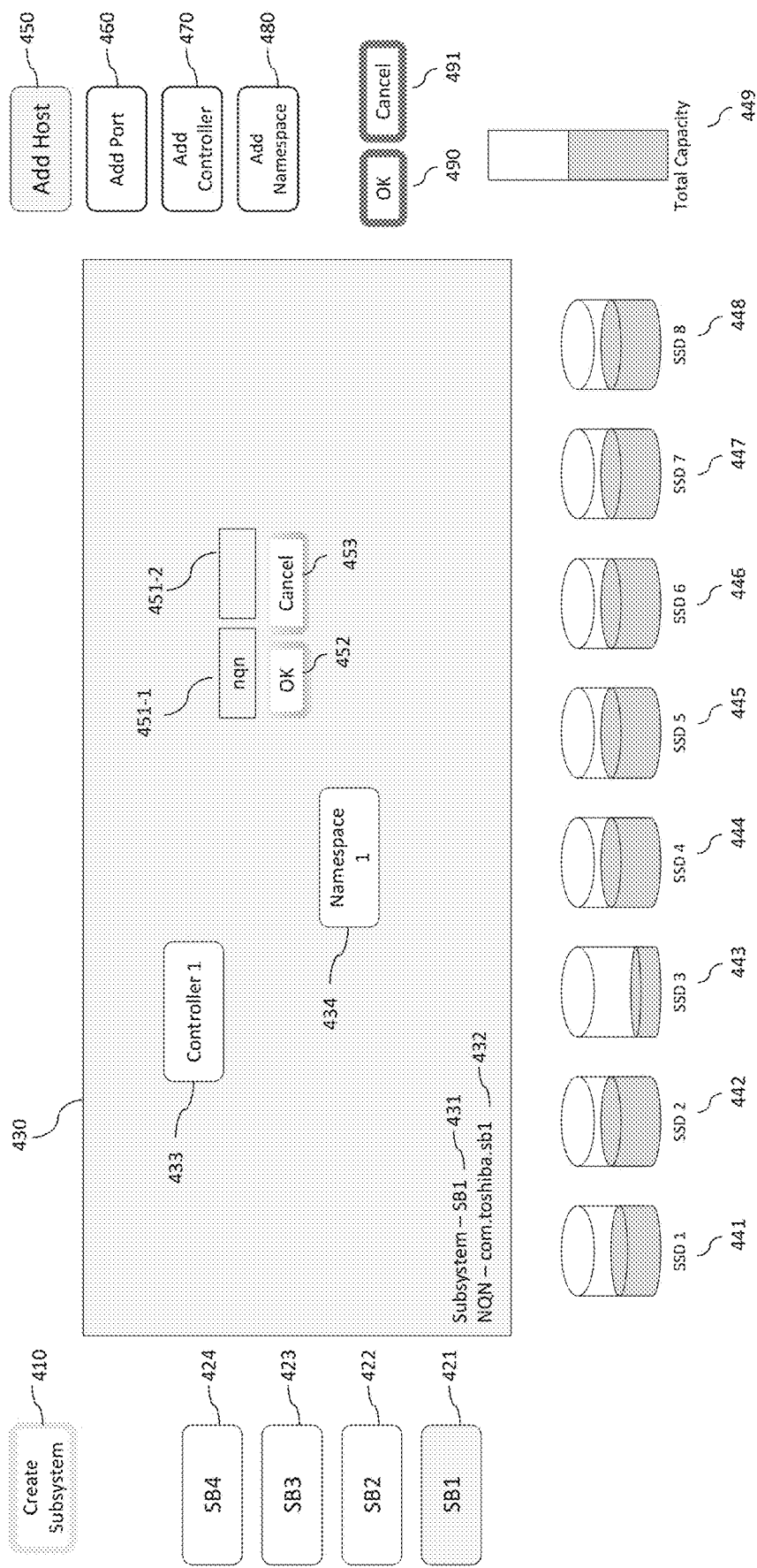

Referring to FIG. 4D, the system generates or displays a host creation GUI (e.g., the "add host" button 450). In response to user selection of the host creation GUI, the host creation GUI may render indication of a first host in the virtual subsystem GUI 430. In one or more embodiments described herein, pressing the "add host" button 450 enables the user to define allowed hosts or an access control list (ACL) for connecting hosts with controllers. For example, if the user clicks the "add host" button 450, the system may render, in the virtual subsystem GUI 430, an input menu related to the parameters of the first host, including a text label 451-1 indicating "NQN", an input interface 451-2, an "OK" button 452, and a "cancel" button 453. As shown in FIG. 4D, the user can specify the NQN (or any worldwide unique identifier) of the first host in the input interface 451-2 to add the first host to the configuration of the virtual subsystem "SB1". When the "OK" button 452 is pressed, the first host is added to the configuration of the virtual subsystem "SB1" and graphical indication of the added host (e.g., a button 455 indicating "host 1" in FIG. 4E) is rendered in the virtual subsystem GUI 430. When the "cancel" button 453 is pressed, the addition of the first host is canceled.

In response to user selection of the host creation GUI, the host creation GUI may render in the virtual subsystem GUI 430 indication of another host in addition to the first host. For example, referring to FIG. 4D, after pressing the "OK" button 452 and (as a result) adding the first host, the user may click the "add host" button 450 again to add a second host to the configuration of the virtual subsystem "SB1". Subsequently, the system may display the same input menu related to the parameters of the second host, including the text label 451-1 indicating "NQN", the input interface 451-2, the "OK" button 452, and the "cancel" button 453.

Figure 4E:
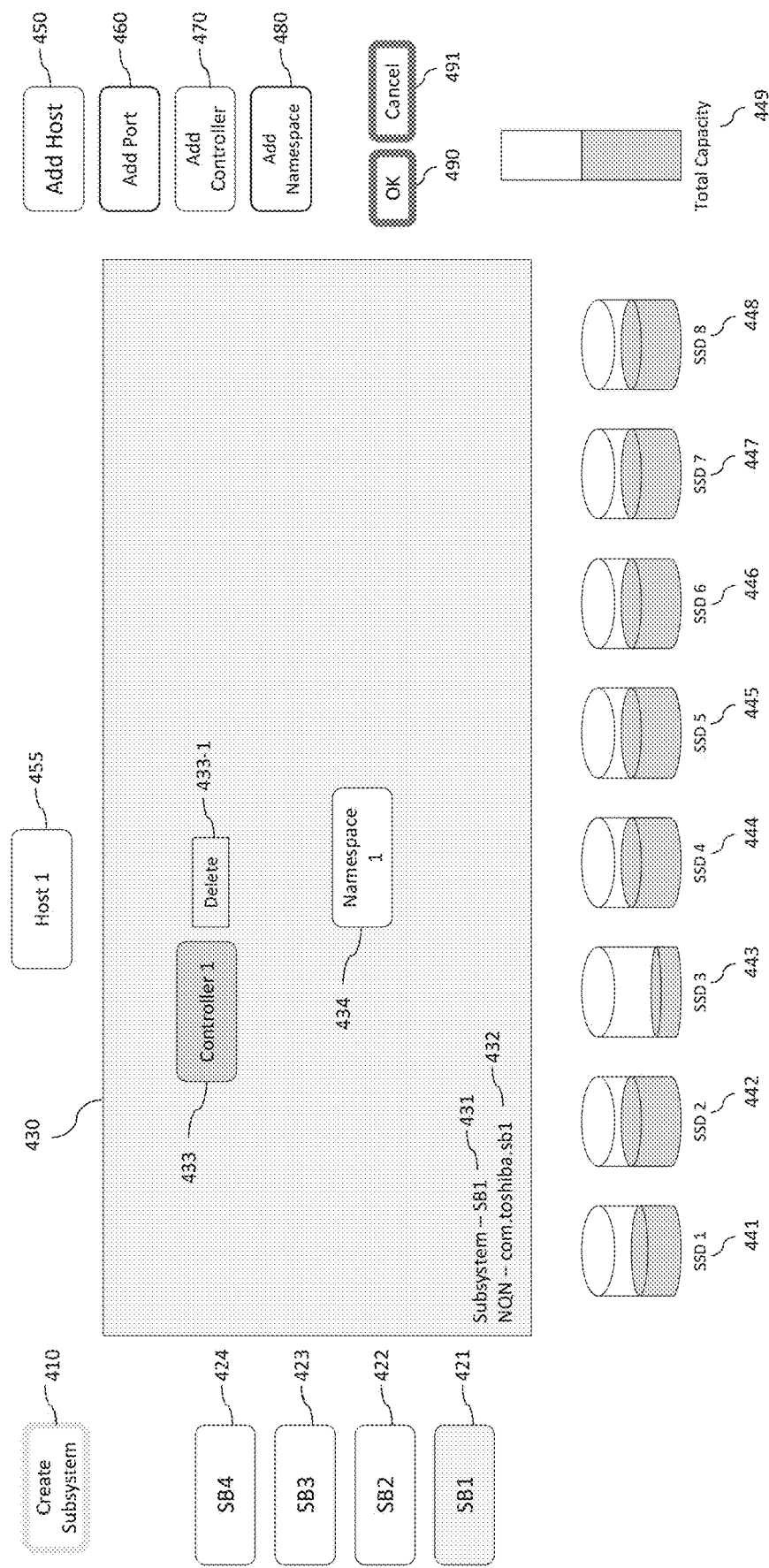

Referring to FIG. 4E, in one or more embodiments described herein, in the virtual subsystem GUI 430, the user can right click an entity for various operations. For example, For example, upon right clicking the controller button 433 indicating "controller 1", the system may render or generate or open a menu including a delete button 433-1. The user can press the delete button 433-1 to delete the "controller 1" from the configuration of the virtual subsystem "SB1" (and also from the virtual subsystem GUI 430).

Figure 4F:
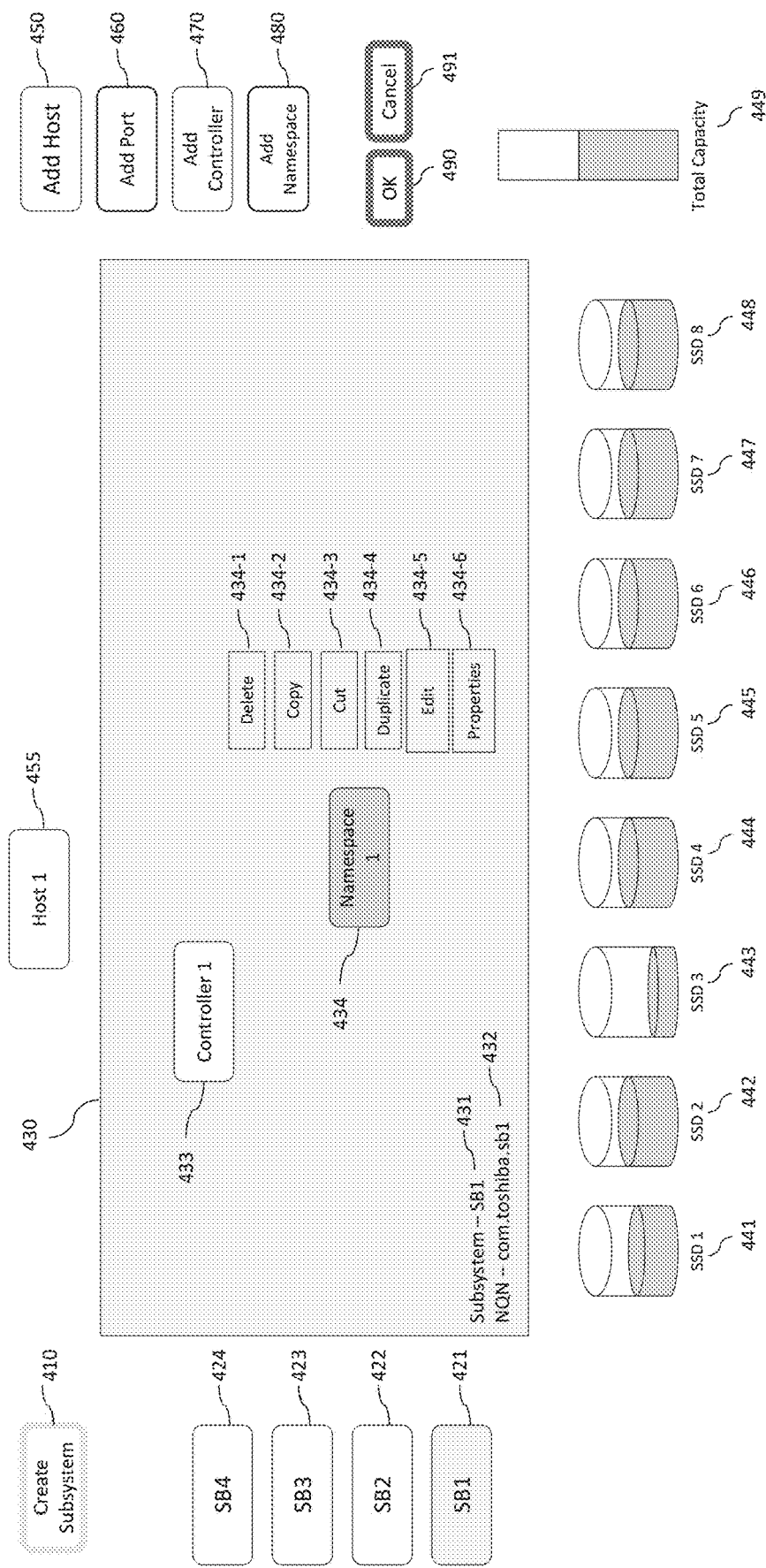

Referring to FIG. 4F, in one or more embodiments described herein, upon right clicking the namespace button 434 indicating "namespace 1", the system may render or generate or open a menu including (1) a delete button 434-1, (2) a copy button 434-2, (3) a cut button 434-3, (4) a duplicate button 434-4, (5) an edit button 434-5, and (6) a properties button 434-6. The user can press these buttons to (1) delete the "namespace 1" from the configuration of the virtual subsystem "SB1" (and also from the virtual subsystem GUI 430), (2) copy or (3) cut the "namespace 1", (4) duplicate the copied or cut "namespace 1", (5) edit the parameters of the "namespace 1" such as the parameters 481-1 to 485-1 in FIG. 4C, and (6) add additional properties of the "namespace 1" such as QoS, SLA, bandwidth or IOPS.

Figure 5A:
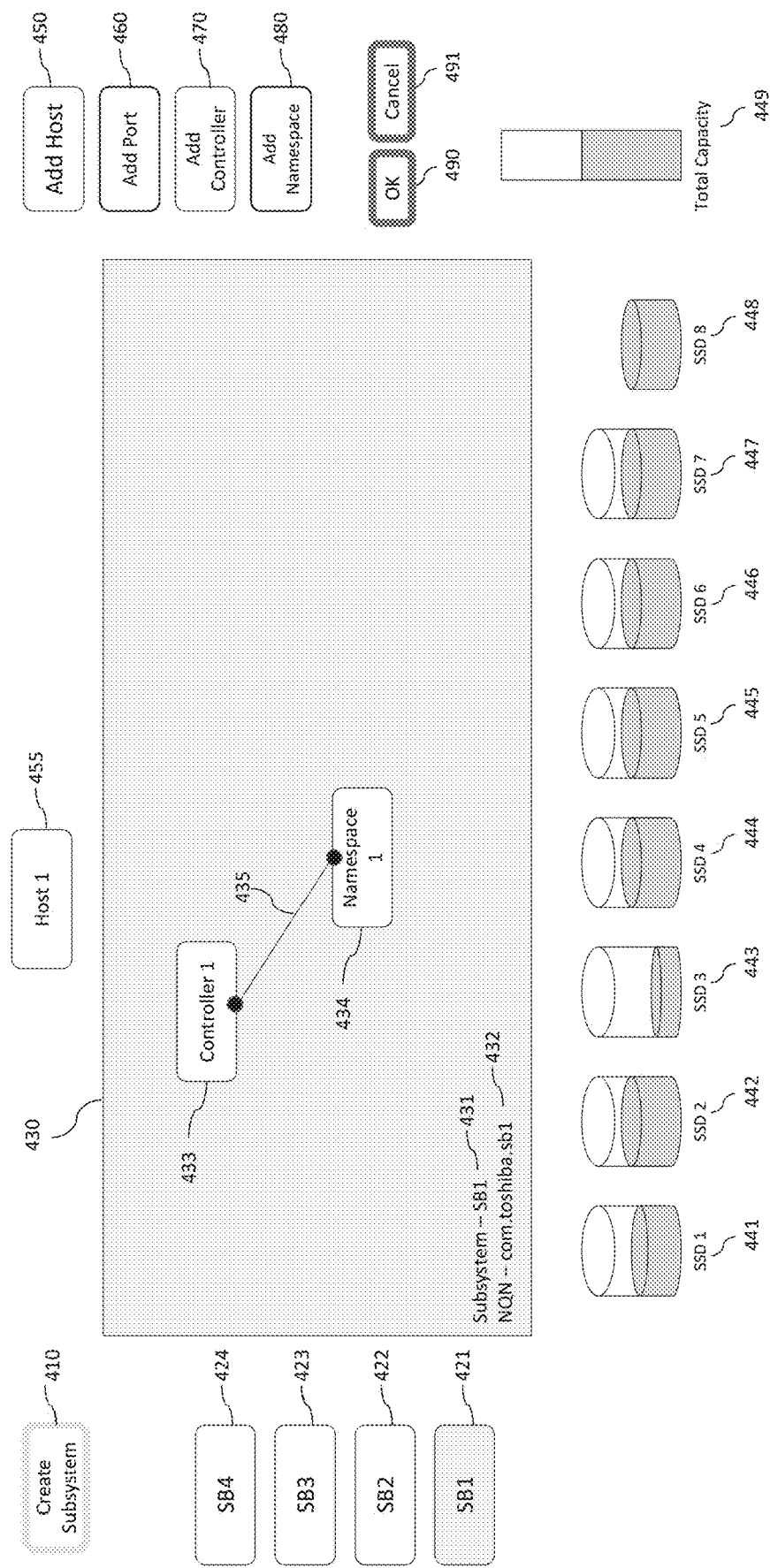
FIGS. 5A-5B show example operations of GUIs for creating connectivity between virtual NVMe entities according to one or more embodiments of the present disclosure.
Figure 5B:
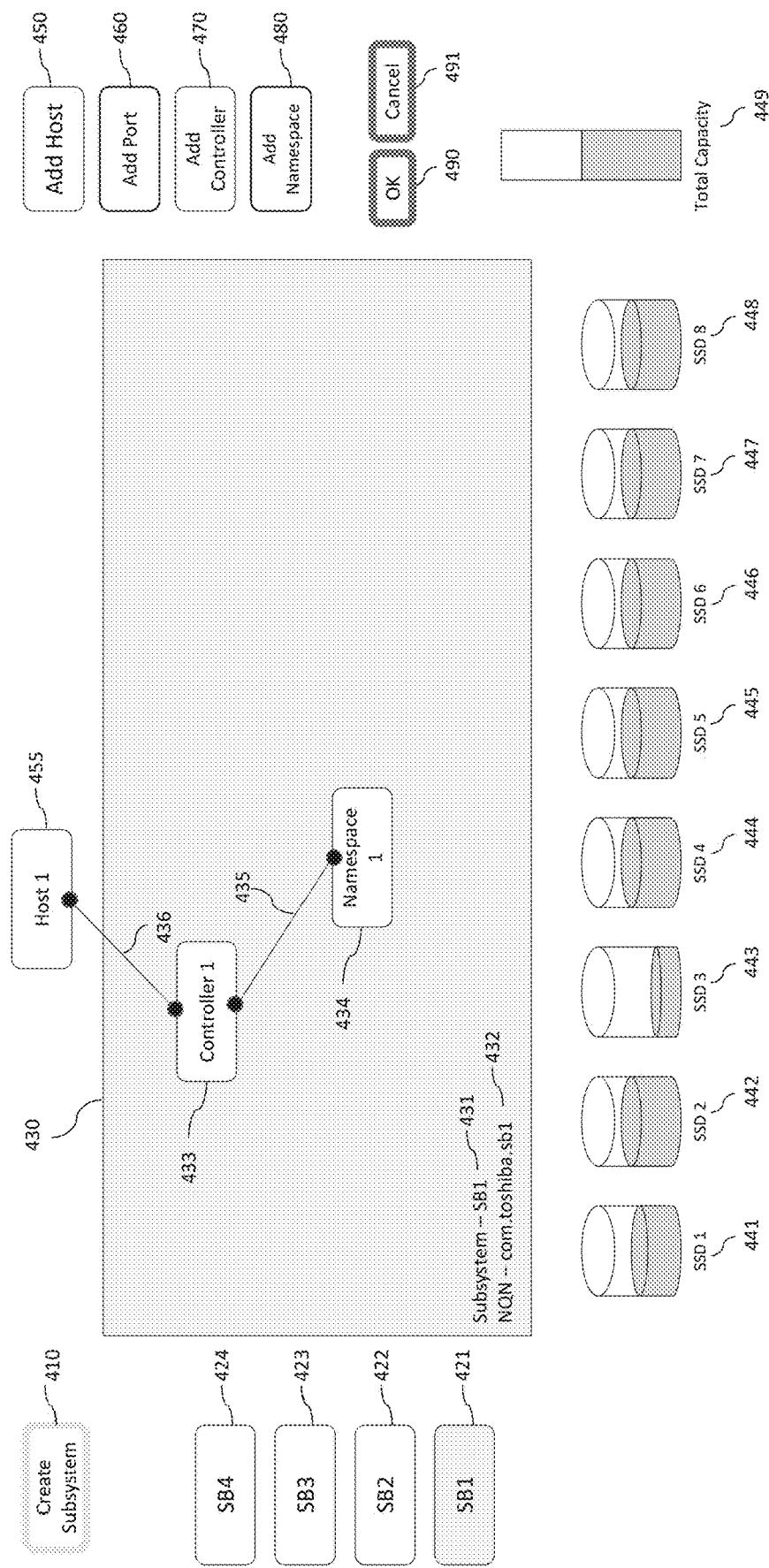

FIGS. 5A-5B show example operations of GUIs for creating connectivity between virtual NVMe entities according to one or more embodiments of the present disclosure. In one or more embodiments described herein, the virtual subsystem configuration system can generate a connectivity GUI (e.g., a simple line drawing between two selected buttons) that can render in the virtual subsystem GUI 430, indication of connectivity between a controller and a namespace (e.g., a line 435 connecting the "controller 1" button 433 and the "namespace 1" button 434 in FIG. 5A) or indication of connectivity between a host and a namespace (e.g., a line 436 connecting the "controller 1" button 433 and the "host 1" button 455 in FIG. 5B).

Referring to 5A, in response to user selection of the indicated first controller and the indicated first namespace, the connectivity GUI (e.g., a simple line drawing between two selected buttons) may render in the virtual subsystem GUI 430, indication of connectivity between the first controller and the first namespace. For example, the user may click one of the "controller 1" button 433 or the "namespace 1" button 434 and draw the line 435 therefrom to the other of the "controller 1" button 433 or the "namespace 1" button 434 using "drag and drop." The user can connect between any controller to any namespace as long as they are rendered in the virtual subsystem GUI 430. In one or more embodiments described herein, the system can provide a GUI to specify parameters (e.g., minimum/maximum of bandwidth or input/output per second (IOPS)) of the added connection between the controller and the namespace. For example, upon right-clicking the added connection line, the system may open up an input menu (not shown) specifying minimum/maximum of bandwidth or IOPS. In one or more embodiments described herein, a thickness of a first rendered line indicating connectivity having a first bandwidth or input/output per second (IOPS) may be greater than a thickness of a second rendered line indicating connectivity having a second bandwidth or IOPS smaller than the first bandwidth or IOPS. For example, if a first line connecting between a first pair of controller and namespace is thicker than a second line connecting between a second pair of controller and namespace, the bandwidth or IOPS of connection between the first pair of controller and namespace is greater than the bandwidth or IOPS of connection between the second pair of controller and namespace. In one or more embodiments described herein, multiple lines can be used to indicate different amounts of bandwidth or IOPS of a connection. For example, a thin line and a thick line can be used to indicate (relatively) small and great amounts of bandwidth or IOPS of respective connections. In one or more embodiments described herein, the system may provide hints and assistance for automating the selection of parameters (e.g., minimum/maximum of bandwidth or input/output per second (IOPS)) of a connection between a controller and a namespace. For example, the system can issue NVMe identify commands to obtain the bandwidth or IOPS of available connections between a controller and a namespace in a storage appliance (e.g., the storage appliance 130 in FIG. 1B) and use the information to provide hints and assistance (e.g., display hint or set default based on entity information obtained from a target storage appliance) for automatically selecting valid parameters of the connection (e.g., the connection 435 in FIG. 5A).

Figure 6:
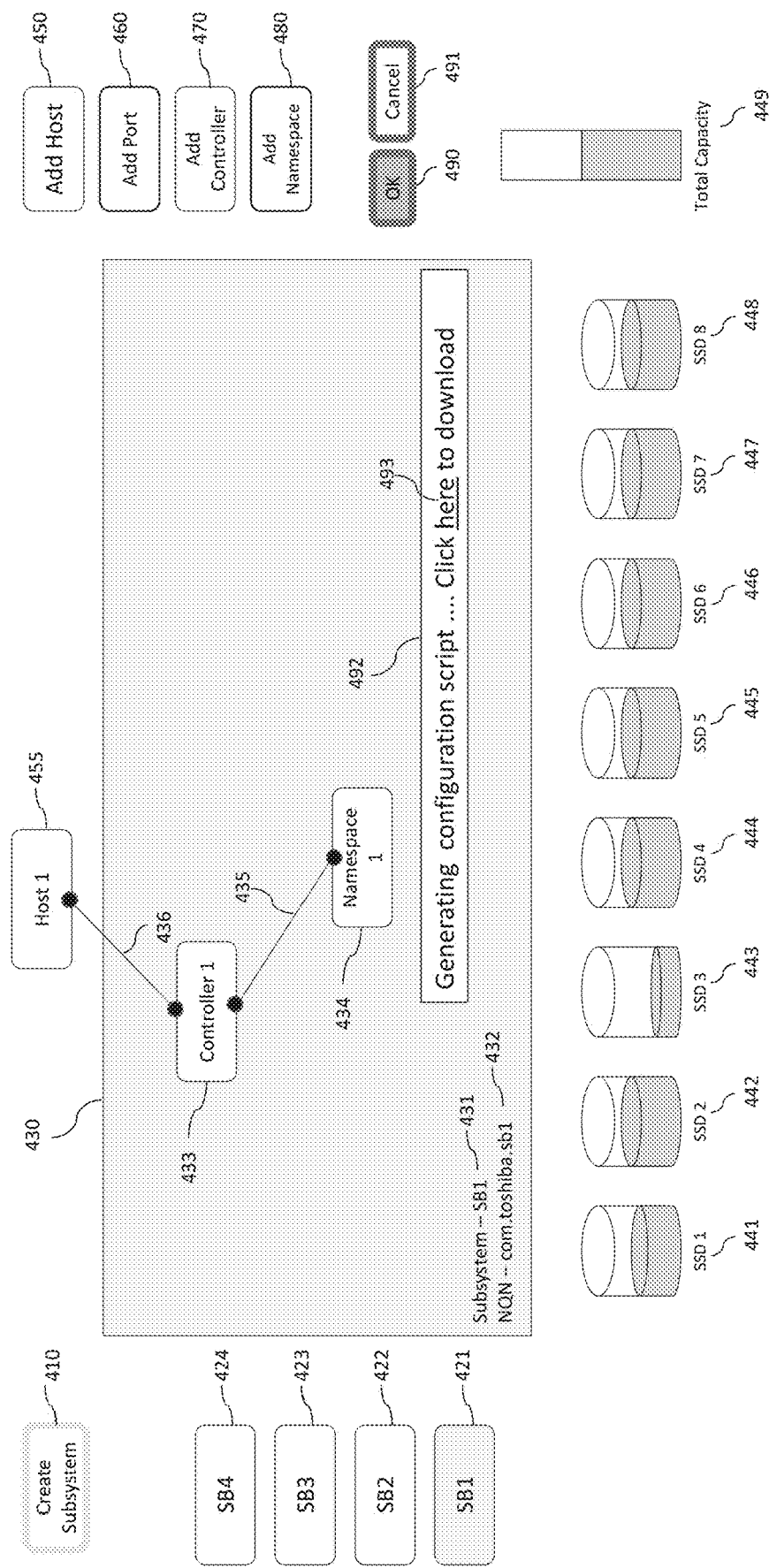
FIG. 6 shows a GUI for creating an appliance configuration based on created virtual NVMe entities according to one or more embodiments of the present disclosure.

Referring to 5B, in response to user selection of the indicated first host and the indicated first controller, the connectivity GUI (e.g., a simple line drawing between two selected buttons) may render in the virtual subsystem GUI 430, indication of connectivity between the first host and the first controller. For example, the user may click one of the "host 1" button 455 or the "controller 1" button 433 and draw the line 436 therefrom to the other of the "host 1" button 455 or the "controller 1" button 433 using "drag and drop." The user can connect between any host to any controller as long as they are rendered in the virtual subsystem GUI 430. In one or more embodiments described herein, the system can provide a GUI to specify parameters (e.g., minimum/maximum of bandwidth or input/output per second (IOPS)) of the added connection between the host and the controller. For example, upon right-clicking the added connection line, the system may open up an input menu (not shown) specifying minimum/maximum of bandwidth or IOPS. In one or more embodiments described herein, a thickness of a first rendered line indicating connectivity having a first bandwidth or input/output per second (IOPS) may be greater than a thickness of a second rendered line indicating connectivity having a second bandwidth or IOPS smaller than the first bandwidth or IOPS. For example, if a first line connecting between a first pair of host and controller is thicker than a second line connecting between a second pair of host and controller, the bandwidth or IOPS of connection between the first pair of host and controller is greater than the bandwidth or IOPS of connection between the second pair of host and controller. In one or more embodiments described herein, the user can connect a host to a controller, thereby generating a configuration that allows an access of the host to the controller:

FIG. 6 shows a GUI for creating an appliance configuration based on created virtual NVMe entities according to one or more embodiments of the present disclosure. In one or more embodiments described herein, after NVMe entities and connectivity therebetween are added to the configuration of a virtual subsystem, the virtual subsystem configuration system can create or generate an appliance configuration by compiling the indication of the configuration of the first virtual subsystem as rendered in the virtual subsystem GUI 430. For example, after the host 1, controller 1 and namespace 1, and connectivity therebetween (e.g., the connectivity between the controller 1 and namespace 1, and the connectivity between the host 1 and the controller 1) are added to the configuration of a virtual subsystem as shown in FIG. 6, the user may click the "OK" button 490 to create or generate an appliance configuration. Upon pressing the "OK" button 490, the system may compile the indication of the configuration of the first virtual subsystem as rendered in the virtual subsystem GUI 430.

In one or more embodiments described herein, in compiling the indication of the configuration of the first virtual subsystem as rendered in the virtual subsystem GUI 430, the system may validate the indicated configuration of the first virtual subsystem. For example, referring to FIG. 6, the system may validate the controller 1 by checking if any controller satisfying the parameters of the controller 1 is available in a storage appliance (e.g., the storage appliance 130 in FIG. 1B). In one or more embodiments described herein, the system is a NVMe host (e.g., the host 101 or 102 in FIG. 1B) that can issue an NVMe identify command to a storage appliance (e.g., the appliance 130) to check the availability of the controller 1 in the storage appliance. The system also may validate the namespace 1 by checking if any namespace satisfying the parameters of the namespace 1 (e.g., number, capacity, priority, workload, disk span as shown in FIG. 4C) is available in a storage appliance (e.g., the storage appliance 130 in FIG. 1B). In one or more embodiments described herein, the system can issue an NVMe identify command to a storage appliance (e.g., the appliance 130) to check the availability of the namespace 1 in the storage appliance (e.g., check if such namespace exists and it is not allocated to any controller). The system also may validate the host 1 by checking if the parameters of the host 1 (e.g., NQN as shown in FIG. 4D) are valid. If the configuration includes a port, the system can issue an NVMe identify command to a storage appliance (e.g., the appliance 130) to check the availability of the port in the storage appliance. The system also may validate the connection (indicated by the line 435) between the controller 1 and the namespace 1 by checking if any connection satisfying the parameters of the connection 435 (e.g., bandwidth or IOPS) is available in a storage appliance (e.g., the storage appliance 130 in FIG. 1B) and if the namespace 1 is already attached to the controller 1. The system can issue an NVMe identify command to a storage appliance (e.g., the appliance 130) to check the availability of such connection in the storage appliance. The system can issue an NVMe namespace attachment command to the storage appliance to check if the namespace 1 is already attached to the controller 1. The system also can validate the connection (indicated by the line 436) between the host 1 and the controller 1 by checking if the host 1 is already connected to the controller 1. The system can issue an NVMe identify command to the storage appliance to check if the host 1 is already connected to the controller 1.

In one or more embodiments described herein, when the appliance configuration as shown in FIG. 6 is implemented in a storage appliance, the appliance can provide the host 1 with storage access to the namespace 1 via the controller 1. Upon pressing the "OK" button 490, if the system detects any configuration/design errors, the system may prompt the appropriate alerts and wait for corrections. Upon pressing the "cancel" button 491, the configuration of the current virtual subsystem (e.g., the virtual subsystem "SB1") may be canceled or the current virtual subsystem may be deleted. Upon pressing the "OK" button 490, if the system successfully validates all of the entities in the configuration GUI of a virtual subsystem and connectivity therebetween (i.e., confirms there is no configuration/design errors), the system may generate an appliance configuration for a target storage appliance (e.g., the appliance 130). In one or more embodiments described herein, the appliance configuration may include NVMe or NVMeoF commands that implement the configuration of the first virtual subsystem as rendered in the virtual subsystem GUI 430. In one or more embodiments described herein, the appliance configuration may be stored in a database in a storage appliance (e.g., the configuration database 133 in the appliance 130 in FIG. 1B). For example, after creating or editing the configuration of a subsystem, pressing the OK button "compiles" and formats the configuration of the subsystem for a target storage appliance, generates an appliance configuration, and store the appliance configuration in a configuration database of the target storage appliance. The appliance configuration stored in the configuration database, if executed by the storage appliance 130, can expose the storage appliance 130 as a virtual subsystem specified by the configuration.

In one or more embodiments described herein, the appliance configuration may be a configuration script or file, textual or binary, that is executable by the target storage appliance and includes NVMe or NVMeoF commands that implement the configuration of the first virtual subsystem as rendered in the virtual subsystem GUI 430. The configuration script, if executed by the storage appliance 130, can expose the storage appliance 130 as a virtual subsystem specified by the configuration. For example, upon pressing the "OK" button 490, if the system successfully confirms there is no configuration/design errors and successfully generates a configuration script, the system may display the message 492 indicating "Generating configuration script . . . Click here to download." The user can download the generated configuration script as a file by clicking a download link 493 embedded in the message 492.

Figure 7:
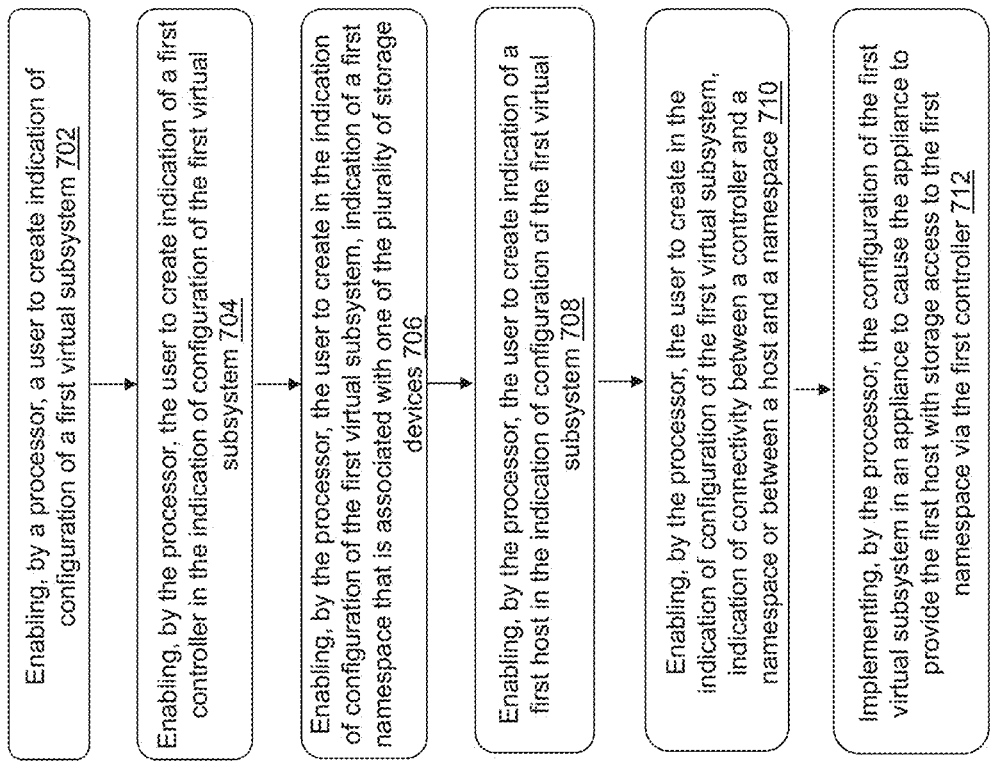
FIG. 7 shows a method for creating virtual NVMe entities according to one or more embodiments of the present disclosure.

FIG. 7 shows a method for creating virtual NVMe entities according to one or more embodiments of the present disclosure. The method can provide, in a virtual subsystem configuration system (e.g., the host 101 or 102 in FIG. 1B or the computing system 3200 in FIG. 3) including a processor and memory, configuration of virtual subsystems that can provide connectivity between a plurality of hosts (e.g., the hosts 1-K in FIG. 1A) and a plurality of storage devices (e.g., the SSDs 132 in FIG. 1B). In a brief overview, the method includes steps 702-712. At step 702, the system enables a user of the computer system to create indication of configuration of a first virtual subsystem. At step 704, the system enables the user to create indication of a first controller. At step 706, the system enables the user to create indication of a first namespace. At step 708, the system enables the user to create indication of a first host. At step 710, the system enables the user to create indication of connectivity between a controller and a namespace or between a host and a namespace. At step 712, the system implements the configuration of the first virtual subsystem in an appliance. Other embodiments contain additional or fewer steps than shown in FIG. 7.

In more detail, at step 702, the system may enable a user of a computer system (e.g., the host 101 or 102 in FIG. 1B or the computing system 3200 in FIG. 3) to create indication of configuration (e.g., the virtual subsystem GUI 430 in FIG. 4A) of a first virtual subsystem (e.g., the virtual system "SB1" in FIG. 4A) configuring connectivity between one or more the plurality of hosts and one or more of the plurality of storage devices. The system may enable the user to create indication of the plurality of storage devices (e.g., the SSDs 441-448 in FIG. 4A) in the indication of configuration of the first virtual subsystem. Indication of each storage device may include indication of usable storage space (e.g., the empty volume of the SSD 441 in FIG. 4A) of each storage device. The indication of the plurality of storage devices may include indication of total usable storage space (e.g., the total capacity in the bar 449 in FIG. 4A) of the plurality of storage devices.

At step 704, the system may enable the user to create indication of a first controller (e.g., the controller 1 (433) in FIG. 4C) in the indication of configuration of the first virtual subsystem. The system may enable the user to create indication of a second controller.

At step 706, the system may enable the user to create in the indication of configuration of the first virtual subsystem, indication of a first namespace (e.g., the namespace 1 (434) in FIG. 4D) that is associated with one of the plurality of storage devices. The system may enable the user to create indication of a second namespace that is associated with one of the plurality of storage devices.

At step 708, The system may enable the user to create indication of a first host (e.g., the host 1 (455) in FIG. 4E) in the indication of configuration of the first virtual subsystem. The system may enable the user to create indication of a second host.

At step 710, the system may enable the user to create in the indication of configuration of the first virtual subsystem, indication of connectivity (e.g., the connection line 435 in FIG. 5A) between a controller (e.g., the controller 1 (433) in FIG. 5A) and a namespace (e.g., the namespace 1 (434) in FIG. 5A) or indication of connectivity (e.g., the connection line 436 in FIG. 5B) between a host (e.g., the host 1 (455) in FIG. 5B) and a controller (e.g., the controller 1 (433) in FIG. 5B).

At step 712, the system may implement the configuration of the first virtual subsystem in an appliance (e.g., the storage appliance 130 in FIG. 1B) to cause the appliance to provide the first host (e.g., the host 1 (455) in FIG. 6) with storage access to the first namespace (e.g., the namespace 1 (434) in FIG. 6) via the first controller (e.g., the controller 1 (433) in FIG. 6).

Figure 8:
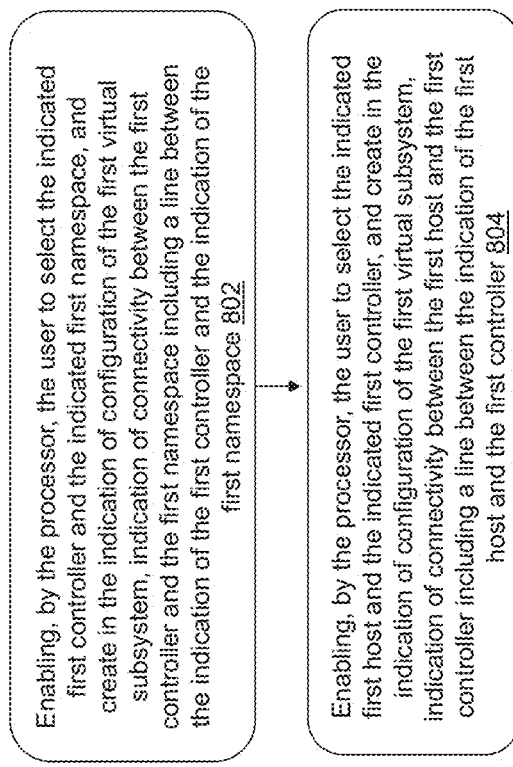
FIG. 8 shows a method for creating connectivity between virtual NVMe entities according to one or more embodiments of the present disclosure.

FIG. 8 shows a method for creating connectivity between virtual NVMe entities (e.g., the connection line 435 in FIG. 5A or the connection line 436 in FIG. 5B) according to one or more embodiments of the present disclosure. In a brief overview, the method includes steps 802-804. At step 802, the system enables the user to select the indicated first controller and the indicated first namespace, and create indication of connectivity between the first controller and the first namespace. At step 804, the system enables the user to select the indicated first host and the indicated first controller, and create indication of connectivity between the first host and the first controller. Other embodiments contain additional or fewer steps than shown in FIG. 8.

In more detail, at step 802, the system may enable the user to select the indicated first controller (e.g., the controller 1 (433) in FIG. 5A) and the indicated first namespace (e.g., the namespace 1 (434) in FIG. 5A), and create indication of connectivity (e.g., the connection line 435 in FIG. 5A) between the first controller and the first namespace in the indication of configuration of the first virtual subsystem. The indication of connectivity between the first controller and the first namespace may include a line between the indication of the first controller and the indication of the first namespace. A thickness of a first line indicating connectivity having a first bandwidth or input/output per second (IOPS) may be greater than a thickness of a second line indicating connectivity having a second bandwidth or IOPS smaller than the first bandwidth or IOPS.

At step 804, the system may enable the user to select the indicated first host (e.g., the host 1 (435) in FIG. 5B) and the indicated first controller (e.g., the controller 1 (433) in FIG. 5B), and create indication of connectivity (e.g., the connection line 436 in FIG. 5B) between the first host and the first controller in the indication of configuration of the first virtual subsystem. The indication of connectivity between the first host and the first controller may include a line between the indication of the first host and the first controller. A thickness of a first line indicating connectivity having a first bandwidth or input/output per second (IOPS) may be greater than a thickness of a second line indicating connectivity having a second bandwidth or IOPS smaller than the first bandwidth or IOPS.

Figure 9:
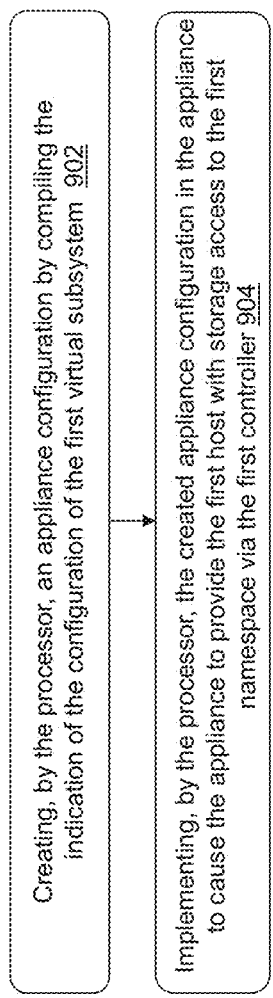
FIG. 9 shows a method for creating an appliance configuration based on created virtual NVMe entities according to one or more embodiments of the present disclosure.

FIG. 9 shows a method for creating an appliance configuration based on created virtual NVMe entities (e.g., the controller 1 (433), the namespace 1 (434) and the host 1 (455) in FIG. 6) according to one or more embodiments of the present disclosure. In a brief overview, the method includes steps 902-904. At step 902, the system creates an appliance configuration. At step 904, the system implements the created appliance configuration in an appliance. Other embodiments contain additional or fewer steps than shown in FIG. 9.

In more detail, at step 902, the system may implement the configuration of the first virtual subsystem (e.g., the virtual subsystem "SB1" in FIG. 6) in an appliance (e.g., the storage appliance 130 in FIG. 1B) to cause the appliance to provide the first host (e.g., the host 1 (455) in FIG. 6) with storage access to the first namespace (e.g., the namespace 1 (434) in FIG. 6) via the first controller (e.g., the controller 1 (433) in FIG. 6). In the implementing the configuration of the first virtual subsystem, the system may create an appliance configuration by compiling the indication of the configuration of the first virtual subsystem.

At step 904, the system may implement the created appliance configuration in the appliance (e.g., the storage appliance 130 in FIG. 1B) to cause the appliance to provide the first host with storage access to the first namespace via the first controller.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. A computer program comprising a non-transitory computer readable storage medium having computer readable program code embodied therein that executes to perform operations, the operations comprising:
    generating a virtual subsystem graphical user interface (GUI) that enables a user to perform configuration of a first storage subsystem, including configuring connectivity between a plurality of hosts and a plurality of storage devices;
    generating a connectivity GUI rendering in the virtual subsystem GUI that enables the user to configure connectivity between a first controller and a first namespace or between a first host and the first namespace in the first storage subsystem;
    in response to user selection of the first controller and the first namespace, rendering, by the connectivity GUI in the virtual subsystem GUI, an indication of controller connectivity between the first controller and the first namespace in the virtual subsystem GUI;
    in response to user selection of the first host and the first controller, rendering, by the connectivity GUI in the virtual subsystem GUI, an indication of host connectivity between the first host and the first controller in the virtual subsystem GUI; and
    implementing the configuration of the first storage subsystem as rendered in the virtual subsystem GUI, in an appliance to cause the appliance to provide the first host with storage access to the first namespace via the first controller via one or both of the controller connectivity and the host connectivity.

2. The computer program product of claim 1, further comprising:
    generating a storage device GUI that enables the user to configure the plurality of storage devices, wherein indication of each storage device includes indication of usable storage space of each storage device,
    wherein the storage device GUI renders indication of total usable storage space of the plurality of storage devices.

3. The computer program product of claim 1, further comprising:
    generating a port creation GUI rendering in the virtual subsystem GUI that enables a user to configure a first port of the first storage subsystem.

4. The computer program product of claim 1, wherein
    the rendering of the indication of controller connectivity between the first controller and the first namespace includes rendering a line between the indicated first controller and the indicated first namespace; and
    the rendering of the indication of host connectivity between the first host and the first controller includes rendering a line between the indicated first host and the indicated first controller.

5. The computer program product of claim 4, wherein a thickness of a first rendered line indicating connectivity having a first bandwidth or input/output per second (IOPS) is greater than a thickness of a second rendered line indicating connectivity having a second bandwidth or IOPS smaller than the first bandwidth or IOPS.

6. The computer program product of claim 1, further comprising:
    rendering in the virtual subsystem GUI, in response to user selection of a namespace creation GUI, indication of a second namespace that is associated with one of the plurality of storage devices;
    rendering in the virtual subsystem GUI, in response to user selection of a controller creation GUI, indication of a second controller; and
    rendering, in response to user selection of a host creation GUI, indication of a second host.

7. The computer program product of claim 1, wherein the implementing the configuration of the first storage subsystem includes:
    creating an appliance configuration by compiling the indication of the configuration of the first storage subsystem as rendered in the virtual subsystem GUI; and
    implementing the created appliance configuration in the appliance to cause the appliance to provide the first host with storage access to the first namespace via the first controller.

8. A system for providing configuration of virtual subsystems, comprising:
    a processor; and
    memory, wherein the processor is configured to:
        generate a virtual subsystem graphical user interface (GUI) that enables a user to perform configuration of a first storage subsystem, including configuring connectivity between the plurality of hosts and the plurality of storage devices;
        generate a connectivity GUI rendering in the virtual subsystem GUI that enables the user to configure connectivity between a first controller and a first namespace or between a first host and the first namespace in the first storage subsystem;
        in response to user selection of the first controller and the first namespace, render, by the connectivity GUI in the virtual subsystem GUI, an indication of controller connectivity between the first controller and the first namespace in the virtual subsystem GUI;

in response to user selection of the first host and the first controller, render, by the connectivity GUI in the virtual subsystem GUI, an indication of host connectivity between the first host and the first controller in the virtual subsystem GUI; and create an appliance configuration by compiling the indication of the configuration of the first storage subsystem as rendered in the virtual subsystem GUI so that when the appliance configuration is implemented in the appliance, the appliance can provide the first host with storage access to the first namespace via the first controller.

9. The system of claim 8, wherein the processor is further configured to:

generate a storage device GUI rendering indication of the plurality of storage devices, wherein indication of each storage device includes indication of usable storage space of each storage device, and render in the storage device GUI, indication of total usable storage space of the plurality of storage devices.

10. The system of claim 8, wherein the processor is further configured to:

generate a port creation GUI rendering in the virtual subsystem GUI; and in response to user selection of the port creation GUI, render indication of a first port of the first storage subsystem.

11. The system of claim 8, wherein in rendering the indication of controller connectivity between the first controller and the first namespace, the processor is further configured to render a line between an indication of the first controller and an indication of the first namespace; and in rendering the indication of host connectivity between the first host and the first controller, the processor is further configured to render a line between an indication of the first host and the indication of the first controller.

12. The system of claim 11, wherein a thickness of a first rendered line indicating connectivity having a first bandwidth or input/output per second (IOPS) is greater than a thickness of a second rendered line indicating connectivity having a second bandwidth or IOPS smaller than the first bandwidth or IOPS.

13. The system of claim 8, wherein the processor is further configured to:

render in the virtual subsystem GUI, in response to user selection of a namespace creation GUI, indication of a second namespace that is associated with one of the plurality of storage devices;

render in the virtual subsystem GUI, in response to user selection of a controller creation GUI, indication of a second controller; and render, in response to user selection of a host creation GUI, indication of a second host.

14. A method for providing configuration of storage subsystems, comprising:

enabling, by a processor of a computer system, a user of the computer system to create indication of configuration of a first storage subsystem including connectivity between a plurality of hosts and a plurality of storage devices;

enabling, by the processor, the user to create in the indication of configuration of the first storage subsystem, indication of connectivity between a controller and a namespace or between a host and a namespace;

enabling, by the processor, the user to select the first controller and the first namespace, and create indication of controller connectivity between the first controller and the first namespace in the indication of configuration of the first storage subsystem;

enabling, by the processor, the user to select the indicated first host and the indicated first controller, and create indication of host connectivity between the first host and the first controller in the indication of configuration of the first storage subsystem; and implementing, by the processor, the configuration of the first storage subsystem in an appliance to cause the appliance to provide the first host with storage access to the first namespace via the first controller and one or both of the controller connectivity and the host connectivity.

15. The method of claim 14, further comprising:

enabling, by the processor, the user to create indication of the plurality of storage devices in the indication of configuration of the first storage subsystem, wherein indication of each storage device includes indication of usable storage space of each storage device, wherein the indication of the plurality of storage devices includes indication of total usable storage space of the plurality of storage devices.

16. The method of claim 14, further comprising:

enabling, by the processor, the user to create indication of a first port of the first storage subsystem in the indication of configuration of the first storage subsystem.

17. The method of claim 14, wherein the indication of controller connectivity between the first controller and the first namespace includes a line between an indication of the first controller and an indication of the first namespace; and the indication of host connectivity between the first host and the first controller includes a line between an indication of the first host and the indication of the first controller.

18. The method of claim 17, wherein a thickness of a first line indicating connectivity having a first bandwidth or input/output per second (IOPS) is greater than a thickness of a second line indicating connectivity having a second bandwidth or IOPS smaller than the first bandwidth or IOPS.

19. The method of claim 14, further comprising:

enabling, by the processor, the user to create indication of a second namespace that is associated with one of the plurality of storage devices;

enabling, by the processor, the user to create indication of a second controller; and enabling, by the processor, the user to create indication of a second host.

20. The method of claim 14, wherein the implementing the configuration of the first storage subsystem includes:

creating, by the processor, an appliance configuration by compiling the indication of the configuration of the first storage subsystem; and implementing the created appliance configuration in the appliance to cause the appliance to provide the first host with storage access to the first namespace via the first controller.

* * * * *